US010721714B2

(12) United States Patent
Fujishiro et al.

(10) Patent No.: US 10,721,714 B2
(45) Date of Patent: Jul. 21, 2020

(54) BASE STATION AND RADIO TERMINAL FOR PERFORMING RADIO ACCESS NETWORK PAGING

(71) Applicant: KYOCERA Corporation, Kyoto (JP)

(72) Inventors: Masato Fujishiro, Yokohama (JP); Kugo Morita, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/357,535

(22) Filed: Mar. 19, 2019

(65) Prior Publication Data
US 2019/0215800 A1 Jul. 11, 2019

Related U.S. Application Data

(63) Continuation of application No. PCT/JP2017/034053, filed on Sep. 21, 2017.
(Continued)

(51) Int. Cl.
H04W 8/08 (2009.01)
H04W 68/06 (2009.01)
(Continued)

(52) U.S. Cl.
CPC ............ H04W 68/06 (2013.01); H04W 8/08 (2013.01); H04W 48/18 (2013.01); H04W 52/02 (2013.01);
(Continued)

(58) Field of Classification Search
CPC ....... H04W 68/06; H04W 8/08; H04W 76/28; H04W 76/27; H04W 68/025;
(Continued)

(56) References Cited

U.S. PATENT DOCUMENTS

2008/0280567 A1 11/2008 Sharma
2014/0370922 A1 12/2014 Richards
(Continued)

FOREIGN PATENT DOCUMENTS

WO 2016/140275 A1 9/2016

OTHER PUBLICATIONS

CATT, "MME initiated paging for light connected UE", 3GPP TSG RAN WG3 Meeting #92, R3-161114, May 23-27, 2016, pp. 1-3, Nanjing, China.
(Continued)

Primary Examiner — Chuong A Ngo
(74) Attorney, Agent, or Firm — Studebaker & Brackett PC

(57) ABSTRACT

A base station according to an embodiment is a base station included in a RAN of a mobile communication system. The base station includes a receiver configured to receive, from a radio terminal in a specific state, a message indicating that the radio terminal has left a RAN paging area, and a transmitter configured to transmit, to a mobility management entity, paging area information related to update of the RAN paging area in response to the reception of the message. The specific state is a state in which an anchor base station in the RAN paging area maintains an S1 connection for the radio terminal and the RAN paging area is configured to the radio terminal.

4 Claims, 14 Drawing Sheets

Related U.S. Application Data

(60) Provisional application No. 62/397,453, filed on Sep. 21, 2016.

(51) Int. Cl.
*H04W 76/27* (2018.01)
*H04W 76/28* (2018.01)
*H04W 68/02* (2009.01)
*H04W 68/00* (2009.01)
*H04W 48/18* (2009.01)
*H04W 52/02* (2009.01)
*H04W 88/04* (2009.01)

(52) U.S. Cl.
CPC ......... *H04W 68/00* (2013.01); *H04W 68/005* (2013.01); *H04W 68/02* (2013.01); *H04W 68/025* (2013.01); *H04W 76/27* (2018.02); *H04W 76/28* (2018.02); *H04W 88/04* (2013.01); *Y02D 70/00* (2018.01); *Y02D 70/10* (2018.01); *Y02D 70/12* (2018.01); *Y02D 70/126* (2018.01)

(58) Field of Classification Search
CPC ... H04W 68/02; H04W 68/005; H04W 68/00; H04W 52/02; H04W 48/18; H04W 88/04; Y02D 70/12; Y02D 70/10; Y02D 70/126; Y02D 70/00
See application file for complete search history.

(56) References Cited

U.S. PATENT DOCUMENTS

2018/0014275 A1 1/2018 Fujishiro et al.
2018/0343659 A1* 11/2018 Hahn ................. H04W 72/085

OTHER PUBLICATIONS

Intel Corporation, "Benefits of RAN based paging (light connection)", 3GPP TSG RAN WG3 Meeting #93, R3-161583, Aug. 22-26, 2016, 10 pages, Goteburg, Sweden.

* cited by examiner

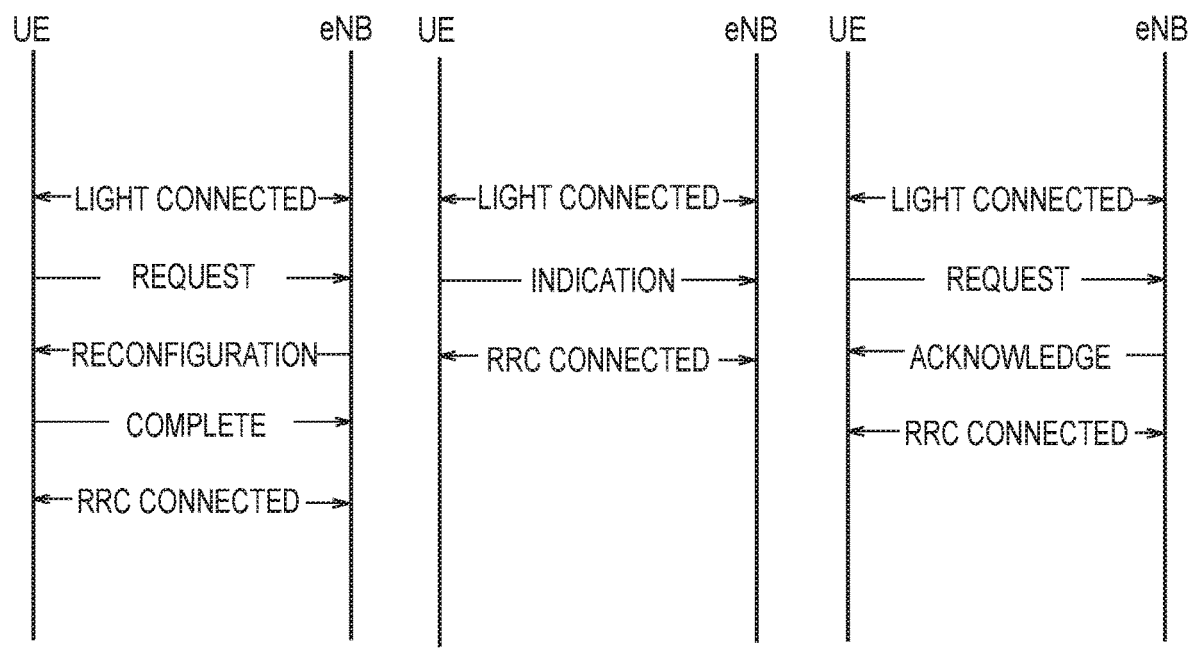

BASE STATION AND RADIO TERMINAL FOR PERFORMING RADIO ACCESS NETWORK PAGING

RELATED APPLICATION

This application is a continuation application of international application PCT/JP2017/034053, filed Sep. 21, 2017, which claims the benefit of U.S. Provisional Application No. 62/397,453, filed on Sep. 21, 2016, the entire contents of which are incorporated herein by reference.

TECHNICAL FIELD

The present disclosure relates to a base station and a radio terminal that are used in a mobile communication system.

BACKGROUND ART

In recent years, with the spread of radio terminals such as smartphones capable of executing a lot of applications, the frequency at which a radio terminal connects to a network and the frequency at which a network performs paging of a radio terminal are increasing.

Therefore, in a mobile communication system, network load accompanying signaling is increasing. In view of such a situation, techniques for reducing signaling are being studied in the 3rd Generation Partnership Project (3GPP), which is the standardization project for mobile communication systems.

SUMMARY OF INVENTION

A communication control method in a mobile communication system, includes: configuring, by a base station included in a RAN, a radio access network (RAN) paging area to a user equipment; and transmitting, from the base station to a neighboring base station, a paging request that requests the neighboring base station to perform a RAN paging for the user equipment, the paging request including identification information of the user equipment and a discontinuous reception configuration of the user equipment, wherein the RAN paging is an operation in which the RAN performs a paging for the user equipment by a unit of the RAN paging area.

The communication control method may further include: performing a cell reselection operation by the user equipment in a specific state in which the RAN paging area is configured; and performing, by the user equipment in the specific state, an operation of transitioning from the specific state to a radio resource control (RRC) idle mode when the user equipment reselects a cell not supporting the specific state in the cell reselection operation.

BRIEF DESCRIPTION OF DRAWINGS

FIGS. 15A to 15C are diagrams illustrating operation examples according to a fifth embodiment.

DESCRIPTION OF EMBODIMENTS

[Mobile Communication System]
(Architecture of Mobile Communication System)

Figure 1:
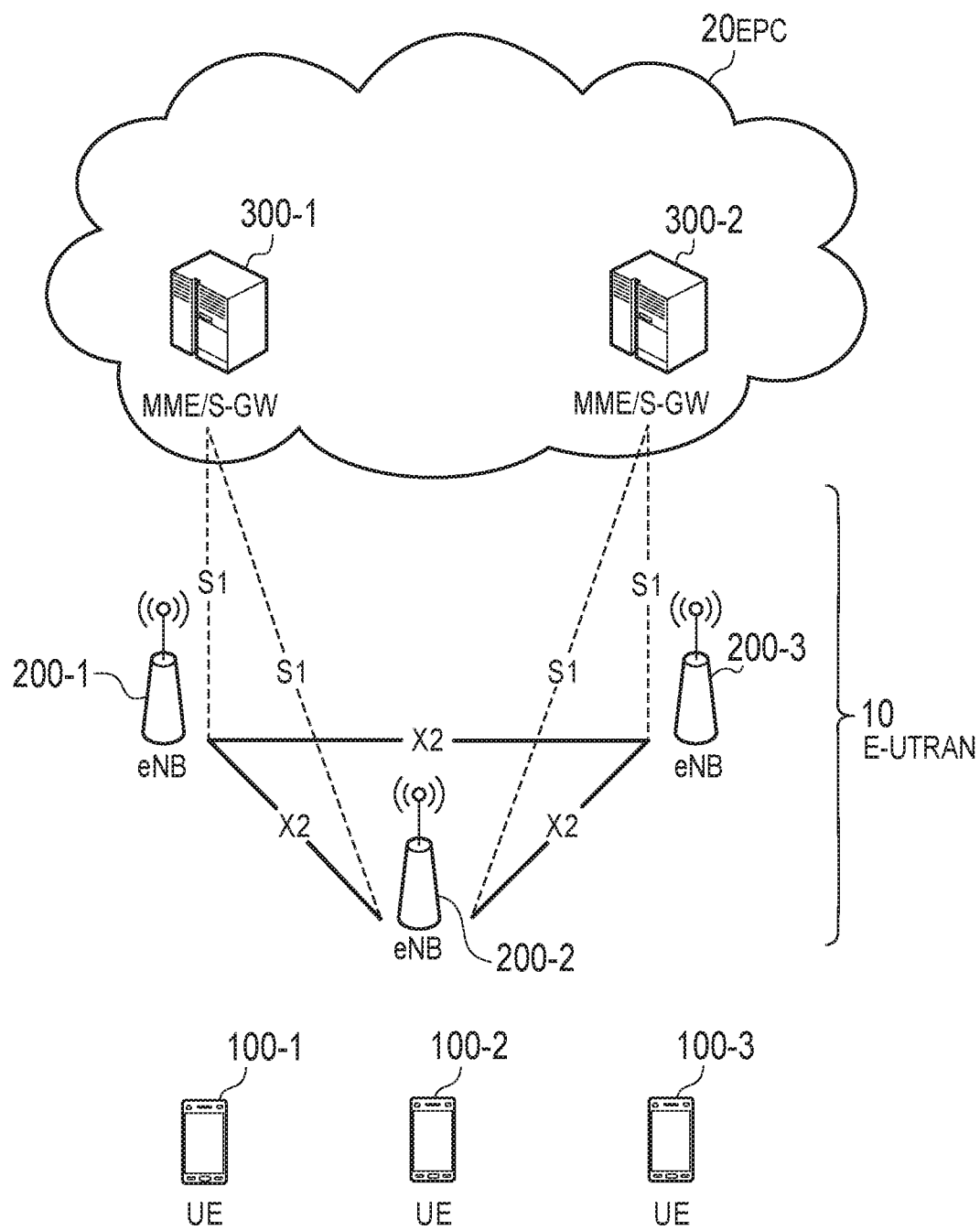
FIG. 1 is a diagram illustrating an architecture of an LTE system according to an embodiment.

Hereinafter, an architecture of a mobile communication system according to an embodiment will be described. FIG. 1 is a diagram illustrating an architecture of a Long Term Evolution (LTE) system that is the mobile communication system according to an embodiment. The LTE system is a mobile communication system based on the 3GPP standard.

As illustrated in FIG. 1, the LTE system includes a radio terminal (user equipment (UE)) 100, a radio access network (evolved-UMTS terrestrial radio access network (E-UTRAN)) 10, and an evolved packet core (EPC) 20.

The UE 100 is a mobile communication apparatus and performs radio communication with an eNB 200 that manages a cell (serving cell) in which the UE 100 exists.

The E-UTRAN 10 includes a base station (evolved Node-B (eNB)) 200. The eNBs 200 are connected to each other via an X2 interface. The eNB 200 manages one or more cells and performs radio communication with the UE 100 that has established connection to the cell. The eNB 200 has a radio resource management (RRM) function, a user data (hereinafter, simply referred to as "data") routing function, a measurement control function for mobility control and scheduling, and the like. The "cell" is used as the term indicating the smallest unit of the radio communication area and is also used as the term indicating the function or resource of performing radio communication with the UE 100.

Figure 6:
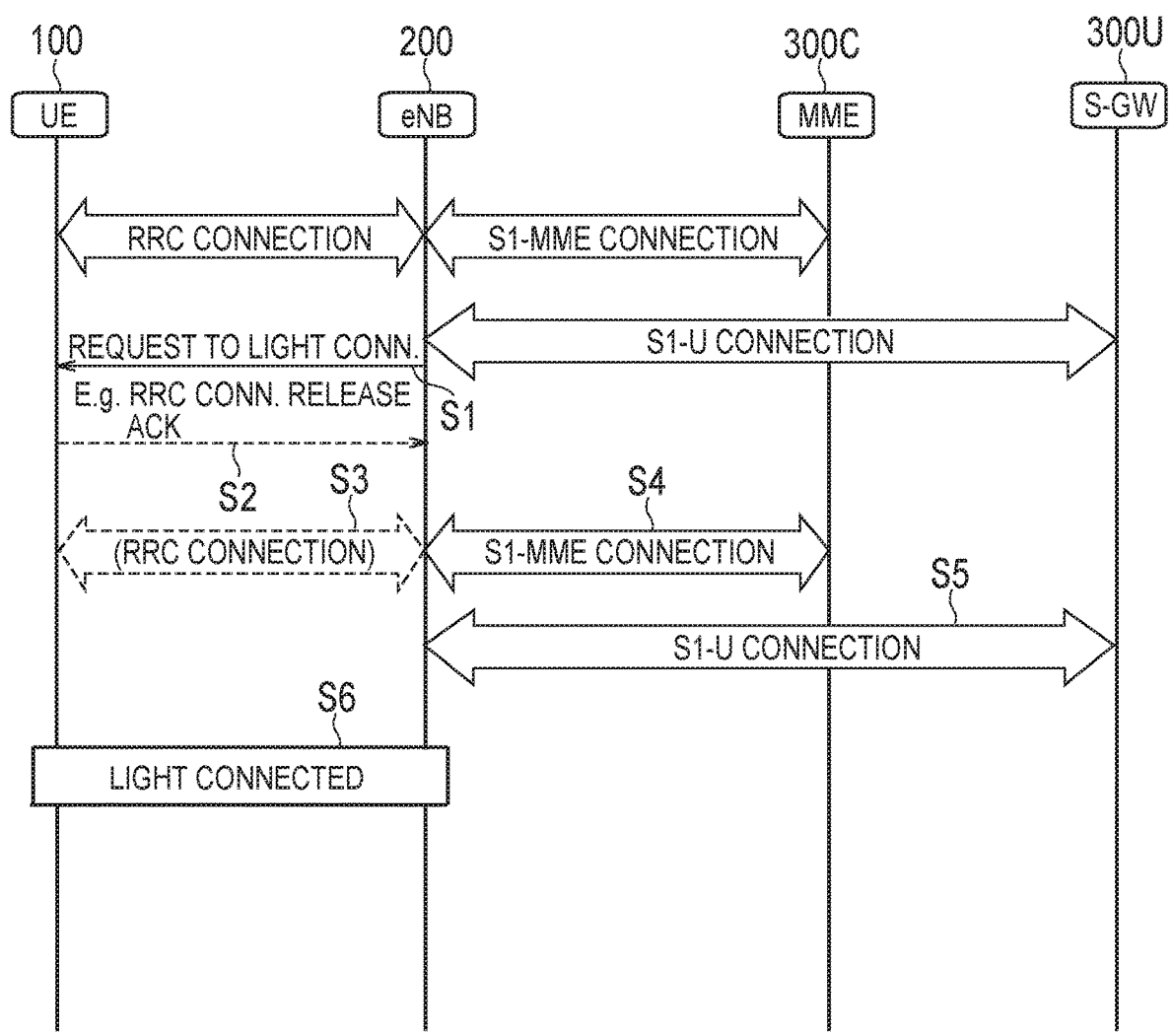
FIG. 6 is a diagram illustrating an overview of an operation related to a transition to a light connected state (specific state) according to an embodiment.

The EPC 20 includes a mobility management entity (MME) 300C and a serving gateway (S-GW) 300U (see FIG. 6 or the like). The MME 300C performs various types of mobility control or the like on the UE 100. The MME 300C communicates with the UE 100 by using non-access stratum (NAS) signaling to manage information of a tracking area (TA) in which the UE 100 exists. The tracking area is an area provided with a plurality of cells. The S-GW 300U performs data transfer control. The MME 300C and the S-GW 300U are connected to the eNB 200 via an S1 interface.

Figure 2:
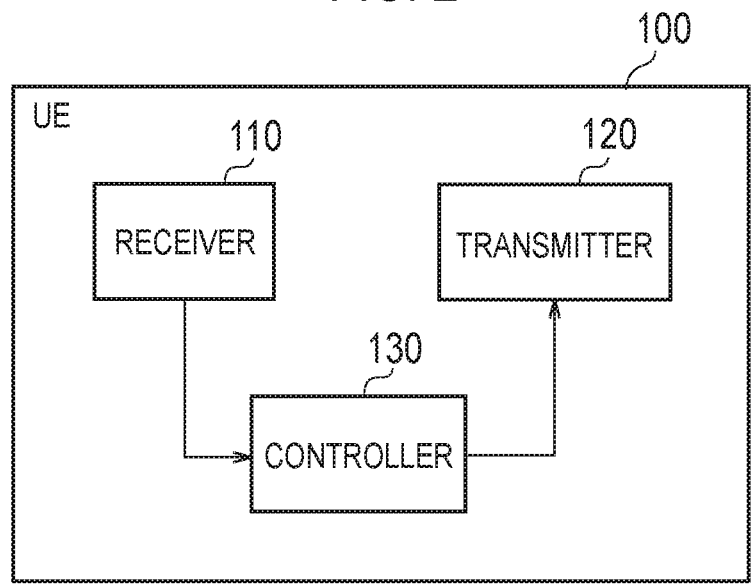
FIG. 2 is a diagram illustrating an architecture of a UE (radio terminal) according to an embodiment.

FIG. 2 is a diagram illustrating the architecture of the UE 100 (radio terminal). As illustrated in FIG. 2, the UE 100 includes a receiver 110, a transmitter 120, and a controller 130.

The receiver 110 performs a variety of reception under the control of the controller 130. The receiver 110 includes an antenna and a receiving machine. The receiving machine converts a radio signal received by the antenna into a baseband signal (reception signal) and outputs the baseband signal to the controller 130.

The transmitter 120 performs a variety of transmission under the control of the controller 130. The transmitter 120 includes an antenna and a transmitting machine. The transmitting machine converts a baseband signal (transmission signal) output by the controller 130 into a radio signal and transmits the radio signal from the antenna.

The controller 130 performs a variety of control on the UE 100. The controller 130 includes at least one processor and a memory. The memory stores a program executed by the processor and information used for processing by the processor. The processor may include a baseband processor that performs modulation and demodulation, coding and decoding, and the like of the baseband signal, and a central processing unit (CPU) that performs a variety of processes by executing a program stored in the memory. The processor performs a process to be described later.

Figure 3:
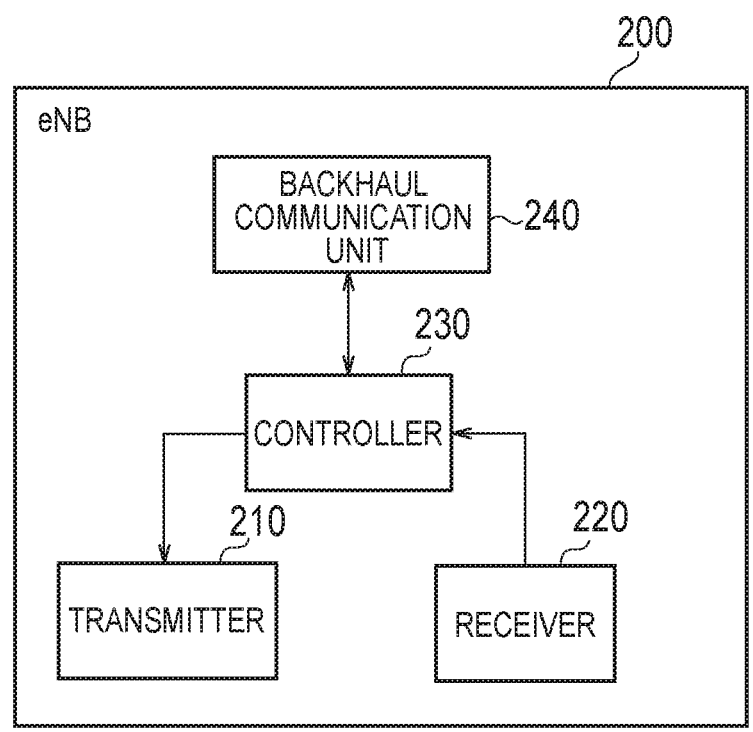
FIG. 3 is a diagram illustrating an architecture of an eNB (base station) according to an embodiment.

FIG. 3 is a diagram illustrating the architecture of the eNB 200 (base station). As illustrated in FIG. 3, the eNB 200 includes a transmitter 210, a receiver 220, a controller 230, and a backhaul communication unit 240.

The transmitter 210 performs a variety of transmission under the control of the controller 230. The transmitter 210 includes an antenna and a transmitting machine. The transmitting machine converts a baseband signal (transmission signal) output by the controller 230 into a radio signal and transmits the radio signal from the antenna.

The receiver 220 performs a variety of reception under the control of the controller 230. The receiver 220 includes an antenna and a receiving machine. The receiving machine converts a radio signal received by the antenna into a baseband signal (reception signal) and outputs the baseband signal to the controller 230.

The controller 230 performs a variety of control on the eNB 200. The controller 230 includes at least one processor and a memory. The memory stores a program executed by the processor and information used for processing by the processor. The processor may include a baseband processor that performs modulation and demodulation, coding and decoding, and the like of the baseband signal, and a CPU that performs a variety of processes by executing a program stored in the memory. The processor performs a process to be described later.

The backhaul communication unit 240 is connected to the neighbor eNB via an X2 interface and connected to the MME/S-GW 300 via an S1 interface. The backhaul communication unit 240 is used for communication performed on the X2 interface, communication performed on the S1 interface, and the like.

It should be noted that the MME 300C includes a controller and a network communication unit. The controller performs a variety of control on the MME 300C. The controller includes at least one processor and a memory. The memory stores a program executed by the processor and information used for processing by the processor. The processor may include a baseband processor that performs modulation and demodulation, coding and decoding, and the like of the baseband signal, and a CPU that performs a variety of processes by executing a program stored in the memory. The processor performs a process to be described later. The network communication unit is connected to the eNB 200 via an S1 interface. The network communication unit is used for communication or the like performed on the S1 interface.

Figure 4:
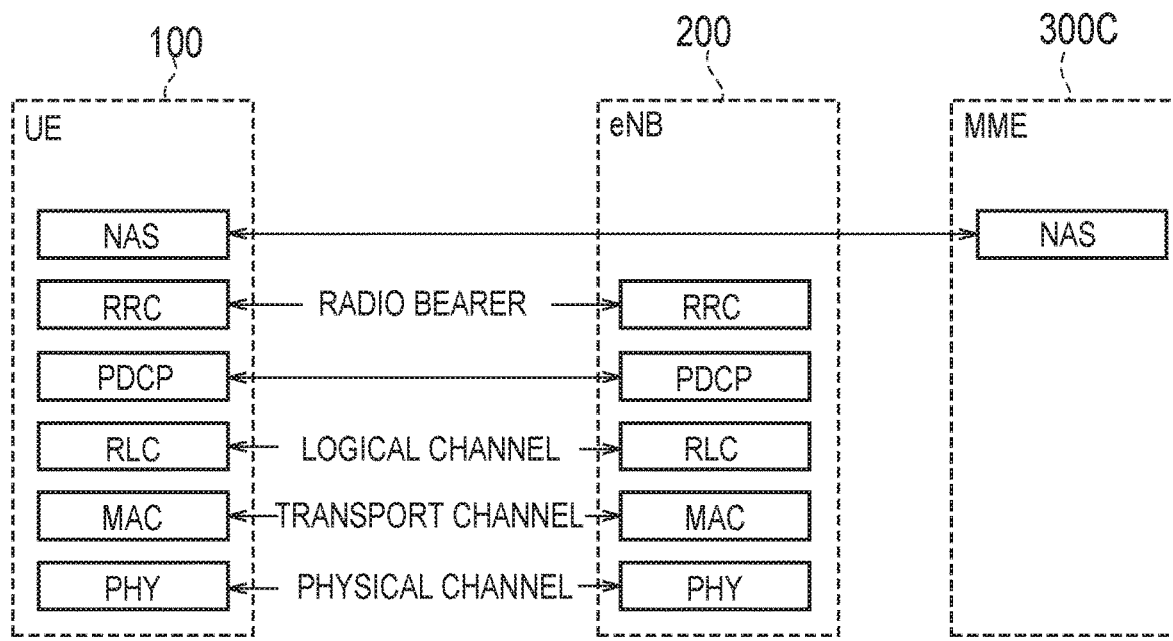
FIG. 4 is a diagram illustrating an architecture of a protocol stack of a radio interface in an LTE system according to an embodiment.

FIG. 4 is a diagram illustrating the architecture of the protocol stack of the radio interface in the LTE system. As illustrated in FIG. 4, a radio interface protocol is divided into a first layer to a third layer of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer. The PHY layer, the MAC layer, the RLC layer, the PDCP layer, and the RRC layer constitute an access stratum (AS) layer.

The PHY layer performs coding and decoding, modulation and demodulation, antenna mapping and demapping, and resource mapping and demapping. Data and control information are transmitted between the PHY layer of the UE 100 and the PHY layer of the eNB 200 via a physical channel.

The MAC layer performs priority control of data, a retransmission process by hybrid ARQ (HARQ), a random access procedure, and the like. Data and control information are transmitted between the MAC layer of the UE 100 and the MAC layer of the eNB 200 via a transport channel. The MAC layer of the eNB 200 includes a scheduler that determines uplink and downlink transport formats (transport block size, modulation and coding scheme (MCS)) and resource blocks allocated to the UE 100.

The RLC layer transmits data to the RLC layer on the receiving side by using the functions of the MAC layer and the PHY layer. Data and control information are transmitted between the RLC layer of the UE 100 and the RLC layer of the eNB 200 via a logical channel.

The PDCP layer performs header compression and decompression, and encryption and decryption.

The RRC layer is defined only in a control plane that handles the control information. RRC signaling for various configurations is transmitted between the RRC layer of the UE 100 and the RRC layer of the eNB 200. The RRC layer controls logical channels, transport channels, and physical channels in response to establishment, re-establishment, and release of radio bearers. If there is a connection (RRC connection) between the RRC of the UE 100 and the RRC of the eNB 200, the UE 100 is in an RRC connected mode; otherwise, the UE 100 is in an RRC idle mode.

A NAS layer, which is located above the RRC layer, performs session management, mobility management, and the like. NAS signaling is transmitted between the NAS layer of the UE 100 and the NAS layer of the MME 300C. It should be noted that the UE 100 has a function such as an application layer in addition to the protocol of the radio interface.

Figure 5:
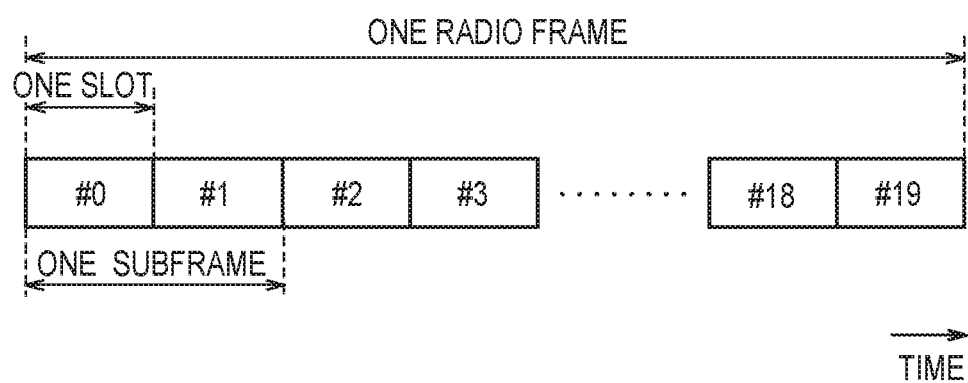
FIG. 5 is a diagram illustrating an architecture of a radio frame used in an LTE system according to an embodiment.

FIG. 5 is a diagram illustrating the architecture of the radio frame used in the LTE system. As illustrated in FIG. 5, the radio frame includes ten subframes on a time axis. Each subframe includes two slots on the time axis. A length of each subframe is 1 ms, and a length of each slot is 0.5 ms. Each subframe includes a plurality of resource blocks (RB) on a frequency axis and includes a plurality of symbols on a time axis. Each resource block includes a plurality of subcarriers on the frequency axis. Specifically, one RB is constituted by twelve subcarriers and one slot. One symbol and one subcarrier constitute one resource element (RE). In addition, among the radio resources (time and frequency resources) allocated to the UE 100, the frequency resource can be specified by the resource block and the time resource can be specified by the subframe (or slot).

In the downlink, a section of several symbols in the head of each subframe is a region that is mainly used as a physical downlink control channel (PDCCH) for transmitting downlink control information. In addition, the remaining portion of each subframe is a region that is mainly used as a physical downlink shared channel (PDSCH) for transmitting downlink data.

Basically, the eNB 200 transmits downlink control information (DCI) to the UE 100 by using the PDCCH and transmits downlink data to the UE 100 by using the PDSCH. The DCI carried by the PDCCH includes uplink scheduling information, downlink scheduling information, and a TPC command. The uplink scheduling information is scheduling information (UL grant) about allocation of uplink radio resources, and the downlink scheduling information is scheduling information related to allocation of downlink radio resources. The TPC command is information instructing increase or decrease of uplink transmission power. The eNB 200 includes a CRC bit scrambled with an identifier (RNTI: radio network temporary ID) of the destination UE 100 in the DCI so as to identify the UE 100 that is the transmission destination of the DCI. Each UE 100 performs blind decoding on the PDCCH by performing CRC check after descrambling with the RNTI of the UE in the DCI that may be addressed to the UE, and detects the DCI addressed to the UE. The PDSCH carries downlink data by the downlink radio resource (resource block) indicated by the downlink scheduling information.

In the uplink, both end portions in the frequency direction in each subframe is a region that is mainly used as a physical uplink control channel (PUCCH) for transmitting uplink control information. The remaining portion of each subframe is a region that is mainly used as a physical uplink shared channel (PUSCH) for transmitting uplink data.

Basically, the UE 100 transmits uplink control information (UCI) to the eNB 200 by using the PUCCH and transmits uplink data to the eNB 200 by using the PUSCH. The UCI carried by the PUCCH includes a channel quality indicator (CQI), a precoding matrix indicator (PMI), a rank indicator (RI), a scheduling request (SR), and HARQ ACK/NACK. The CQI is an index indicating downlink channel quality and is used for determining the MCS to be used for downlink transmission or the like. The PMI is an index indicating a precoder matrix that is preferably used for downlink transmission. The RI is an index indicating the number of layers (number of streams) that can be used for downlink transmission. The SR is information requesting allocation of PUSCH resources. The HARQ ACK/NACK is delivery confirmation information indicating whether the downlink data has been correctly received.

(Specific State)

Hereinafter, a specific state according to an embodiment will be described. The specific state is a state in which the signaling for the UE 100 is suppressed while an S1 connection for the UE 100 is maintained. The S1 connection may be referred to as an S1 bearer. The S1 connection is a connection established between the eNB 200 and the EPC 20 on the S1 interface. The S1 interface includes an S1-U interface for a user plane and an S1-MME interface for a control plane. The S1 connection includes an S1-U connection established between the eNB 200 and the S-GW 300U on the S1-U interface, an S1-MME connection established between the eNB 200 and the MME 300C on the S1-C interface.

The specific state may be one state of an RRC connected mode or one state of an RRC idle mode. Alternatively, the specific state may be an RRC idle mode and an RRC state different from the RRC idle mode. In an operation pattern 1 of an embodiment, the specific state is one state (substate) of the RRC connected mode. On the other hand, in an operation pattern 2 of an embodiment, the specific state is one state (substate) of the RRC connected mode. According to the specific state, signaling is reduced as compared with a general RRC connected mode. In addition, according to the specific state, the UE 100 can start data communication quickly, as compared with a general RRC idle mode. Hereinafter, the specific state is referred to as "light connected state (light connected substate)".

FIG. 6 is a diagram illustrating an overview of an operation related to a transition to a light connected state (specific state). In an initial state of FIG. 6, the UE 100 is in an RRC connected mode, and an RRC connection is established between the UE 100 and the eNB 200. In addition, an S1-MME connection is established between the eNB 200 and the MME 300C. An S1-U connection is established between the eNB 200 and the S-GW 300U. The UE 100 performs data communication with the eNB 200.

As illustrated in FIG. 6, in step S1, the eNB 200 transmits, to the UE 100, a transition instruction (Request to Light Conn.) instructing a transition to the light connected state.

In step S2, the UE 100 transmits an acknowledgment (Ack) message to the eNB 200 in response to reception of the transition instruction. However, step S2 is not essential and can be omitted.

In step S3, the UE 100 and the eNB 200 maintain or release the RRC connection. Specifically, in the operation pattern 1 of the embodiment, the UE 100 and the eNB 200 maintain the RRC connection. On the other hand, in the operation pattern 2 of the embodiment, the UE 100 and the eNB 200 release the RRC connection.

In step S4, the eNB 200 and the MME 300C maintain the S1-MME connection. In step S5, the eNB 200 and the S-GW 300U maintain the S1-U connection. In step S6, the UE 100 transitions to the light connected state and suspends data communication with the eNB 200.

The eNB 200 maintains context information (UE context) of the UE 100 that has transitioned to the light connected state, without discarding the context information. The UE context includes information related to various configurations and capabilities for the UE 100. The various configurations include a configuration of access stratum (AS).

The UE 100 in the light connected state can resume data communication with the eNB 200 with less signaling by using the maintained S1 connection and UE context.

The UE 100 that has transitioned to the light connected state in the cell of the first eNB 200 may move from the cell of the first eNB 200 to the cell of the second eNB 200. If the UE 100 resumes data communication in the cell of the second eNB 200, the second eNB 200 acquires the UE context of the UE 100 on the X2 interface from the first eNB 200 and uses the acquired UE context for data communication with the UE 100.

In an embodiment, RAN paging is applied to the UE 100 in the light connected state. RAN paging performs paging in units of predetermined paging areas in which paging is controlled by the E-UTRAN 10 (eNB 200). The predetermined paging area is an area narrower than the tracking area. By introducing a predetermined paging area, it is possible to reduce the number of cells that perform paging on one UE 100, thereby reducing signaling. Hereinafter, such a predetermined paging area will be referred to as an "RAN paging area".

As an example, the RAN paging area (predetermined paging area) is constituted by the cell of the specific eNB 200 maintaining the S1 connection of the UE 100 in the light connected state and the cell of the eNB 200 around the specific eNB 200. The neighbor eNB 200 may be an eNB 200 having an X2 interface with the specific eNB 200. If the NAS signaling or data addressed to the UE 100 in the light connected state is received from the MME/S-GW 300, the specific eNB 200 determines that RAN paging is to be performed, and the UE 100 performs paging together with the neighbor eNB 200. The paging may be performed by transmitting an RRC paging message, or may be performed by transmitting data addressed to the UE 100 as a paging message. The specific eNB 200 may be referred to as an anchor eNB.

(Operation Pattern 1)

Hereinafter, an operation pattern 1 of an embodiment will be described.

In the operation pattern 1, the UE 100 in the RRC connected mode receives, from the eNB 200, a message instructing the configuration change of the RRC connection, and changes the configuration according to the reception of the message. As an example, the message is an RRC connection reconfiguration message. As another example, the message is a message different from the RRC connection reconfiguration message. In the operation pattern 1, a case in which the message is the RRC connection reconfiguration message is assumed. The eNB 200 changes the RRC configuration of the UE 100 by transmitting the RRC connection reconfiguration message to the UE 100.

The eNB 200 transitions the UE 100 to the light connected state by including information instructing the transition to the light connected state in the RRC connection reconfiguration message. The UE 100 transitions to the light connected state in response to the fact that the information instructing the transition to the light connected state is included in the RRC connection reconfiguration message. In the operation pattern 1, the light connected state is a state in which at least one function for generating signaling with the eNB 200 among a plurality of functions of the UE 100 is deactivated while maintaining the RRC connection.

Here, the plurality of functions (features) may include a data (user data) transceiving function, a scheduling request (SR) transmitting function, a channel state information (CSI) transmitting (that is, CSI feedback) function, a sounding reference signal (SRS) transmitting function, a carrier aggregation function, a dual connectivity function, a semi-persistent scheduling (SPS) function, a WLAN aggregation function, a radio link monitoring (RLM) function, a notification (in-device coexistence indication UE assistance information, MBMS interest indicator, sidelink UE information, etc) function, an idle mode discontinuous reception (DRX) function, and a WLAN interwork function using broadcast signaling. However, in the light connected state, at least one of the cell reselection function, a connected mode DRX function, and the WLAN interworking function using dedicated signaling may be maintained in an activated state without being deactivated. For details of these functions, see, for example, 3GPP technical specification "TS36.300 V 13.4.0".

Figure 7:
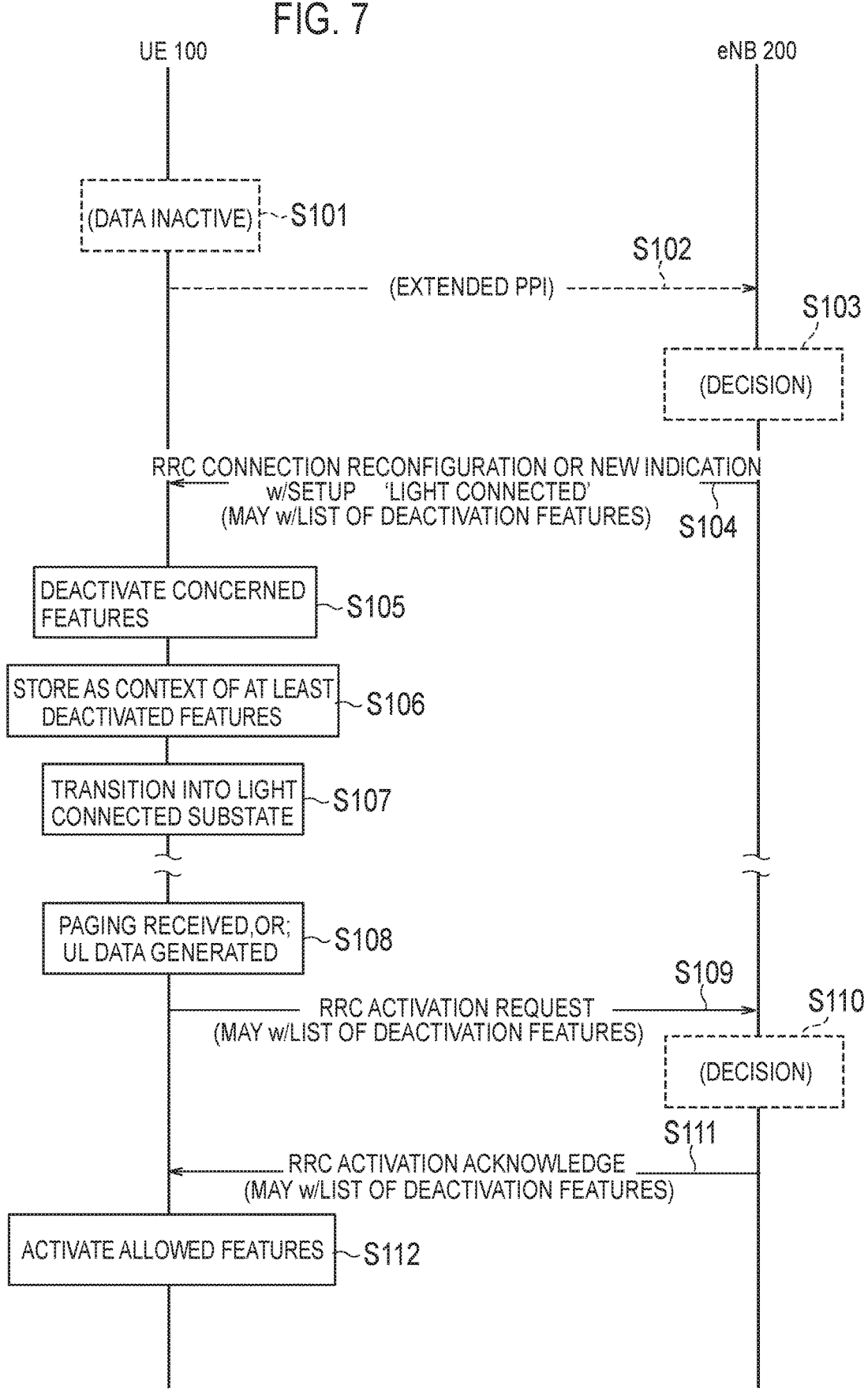
FIG. 7 is a diagram illustrating an operation pattern 1 of an embodiment.

FIG. 7 is a diagram illustrating the operation pattern 1 of the embodiment. In the initial state of FIG. 7, the UE 100 is in the RRC connected mode and performs data communication with the eNB 200. It should be noted that the process indicated by the dashed line in FIG. 7 is not essential and can be omitted.

As illustrated in FIG. 7, in step S101, the UE 100 detects interruption of data communication with the eNB 200.

The interruption of the data communication may include a case in which downlink (DL) data is not received (or it is unlikely to receive downlink (DL) data) and/or a case in which uplink (UL) data is not transmitted (or it is unlikely to transmit uplink (UL) data). Here, the likelihood may be a state in which it is predicted that data will not be generated in a certain period. The predetermined period may be configured from the eNB 200. The configuration from the eNB 200 to the UE 100 is performed by RRC signaling. The RRC signaling may be a UE-dedicated signaling (for example, an RRC connection reconfiguration message) or a broadcast signaling (for example, a system information block (SIB)).

As an example, the RRC layer of the UE 100 detects interruption of data communication with the eNB 200 based on information of a layer (for example, application layer) higher than the RRC layer. As an example, the RRC layer of the UE 100 may detect interruption of data communication in response to shutdown of an application with the highest communication frequency at the present time. As another example, the RRC layer of the UE 100 may detect interruption of data communication in response to the fact that the operation system (OS) makes communication restrictions, the fact that there are no applications running in the foreground (that is, there is only the background process), and the fact that the OS determines that the data communication is interrupted.

In step S102, the UE 100 transmits, to the eNB 200, a notification indicating that the data communication is interrupted. The UE 100 may transmit the notification by signaling of the RRC layer. The signaling of the RRC layer may be a UE assistance information message or another message. If the notification indicating the interruption of the data communication is transmitted in the UE assistance information message, the notification may be referred to as an extended power preference indicator (extended PPI).

In step S103, the eNB 200 determines to make the UE 100 transition to the light connected state in response to reception of the notification indicating the interruption of the data communication.

In step S104, the eNB 200 transmits, to the UE 100, an RRC connection reconfiguration message (or another message) including information instructing a transition to the light connected state. In other words, the eNB 200 transmits the instruction of the transition to the light connected state as the configuration change of the RRC connection.

The information instructing the transition to the light connected state is, for example, "Light Connected=Setup". In addition, the RRC connection reconfiguration message may include information designating a deactivation function among the plurality of functions described above. As an example, the eNB 200 includes a list of activation maintenance functions or a list of deactivation functions in the RRC connection reconfiguration message in order to individually designate functions to be deactivated.

In step S105, the UE 100 deactivates a predetermined function among the plurality of functions (features) described above in response to the reception of the RRC connection reconfiguration message including the information instructing the transition to the light connected state. If the deactivated function is designated by the RRC connection reconfiguration message, the UE 100 deactivates only the designated function.

In step S106, the UE 100 holds the configuration information (AS context) of the predetermined function even if the predetermined function is deactivated. In other words, even if transitioning to the light connected state, the UE 100 maintains the configuration information of the deactivated function without discarding the deactivating function.

In step S107, the UE 100 transitions to the light connected state. In the operation pattern 1, the light connected state is one state (substate) of the RRC connected mode. The UE 100 in the light connected state performs a process for receiving a paging message transmitted within an RAN paging area.

After that, in step S108, the UE 100 in the light connected state detects a predetermined event in the UE 100. The predetermined event is either the reception of the paging message from the eNB 200 or the occurrence of the UL data to be transmitted to the eNB 200. The predetermined event may be that the UL data is generated and the amount of the UL data is equal to or greater than a threshold value. The threshold value may be configured to the UE 100 from the eNB 200.

In step S109, the UE 100 in the light connected state transmits, to the eNB 200, an activation request (RRC activation request) requesting the activation of the deactivated function in response to the detection of the predetermined event.

The activation request may require the activation of all the deactivated functions or may require the activation of some deactivated functions. In the case of requesting the activation of all the deactivated functions, the activation request may be a stop request of the light connected state (that is, a transition request to a normal RRC connected mode). On the other hand, in the case of requesting the activation of all the deactivated functions, the activation request may include a list of functions to be activated, or may include a list of functions to maintain a deactivated state.

In step S110, in response to the reception of the activation request, the eNB 200 determines whether the request is acceptable. Here, the description will be given on the assumption that the eNB 200 determines that the request is acceptable. It should be noted that if the eNB 200 determines that the request is not acceptable, the eNB 200 may transmit a non-acknowledgment (Nack) or a rejection notification (Reject) to the UE 100.

In step S111, the eNB 200 transmits, to the UE 100, an acknowledgment (RRC activation acknowledge) to the activation request. It should be noted that the eNB 200 may determine whether to accept the activation request for each function. In this case, the eNB 200 may include, in the RRC activation acknowledge, a list of functions that permit activation and/or a list of functions that reject activation. Alternatively, instead of the acknowledgment, an RRC connection reconfiguration message may be used.

In step S112, the UE 100 determines whether to activate the deactivated function based on the contents of the response received from the eNB 200. If the acknowledgment is received, the UE 100 activates the permitted function. The UE 100 activates the function from the time point (subframe) when the acknowledgment is received. Alternatively, the UE 100 may activate the function within a certain period (for example, within eight subframes) after the acknowledgment is received.

(Operation Pattern 2)

In the operation pattern 2 of the embodiment, a difference from the operation pattern 1 will be mainly described below.

In the operation pattern 2, the UE 100 in the RRC connected mode receives, from the eNB 200, an RRC connection release message instructing the release of the RRC connection, and releases the RRC connection in response to the reception of the RRC connection release message. The RRC connection release message includes a field (release cause) indicating the cause of releasing the RRC connection. The UE 100 transitions to the light connected state in response to the fact that the field includes information (for example, RRC-LightConnected) instructing the transition to the light connected state is included in the field. The eNB 200 transitions the UE 100 to the light connected state by including the information instructing the transition to the light connected state in the field. Alternatively, the light connected state may be one state in the network (that is, the eNB and the MME/S-GW). In this case, the RRC state of UE 100 is idle. However, the eNB 200 may cause the UE to hold the context (configuration information). In this case, the eNB 200 configures the release cause of the RRC connection release to rrc-Suspend, and notifies the UE 100 of resume ID (resumeIdentity) that is an identifier corresponding thereto. The state may be referred to as a state in which the RRC connection is suspended.

In the operation pattern 2, the light connected state is a state in which the RRC connection is released and the S1 connection for the UE 100 is maintained between the eNB 200 and the core network (EPC 20). In the operation pattern 2, the light connected state may be further a state in which at least a part of the plurality of functions described above is deactivated.

Figure 8:
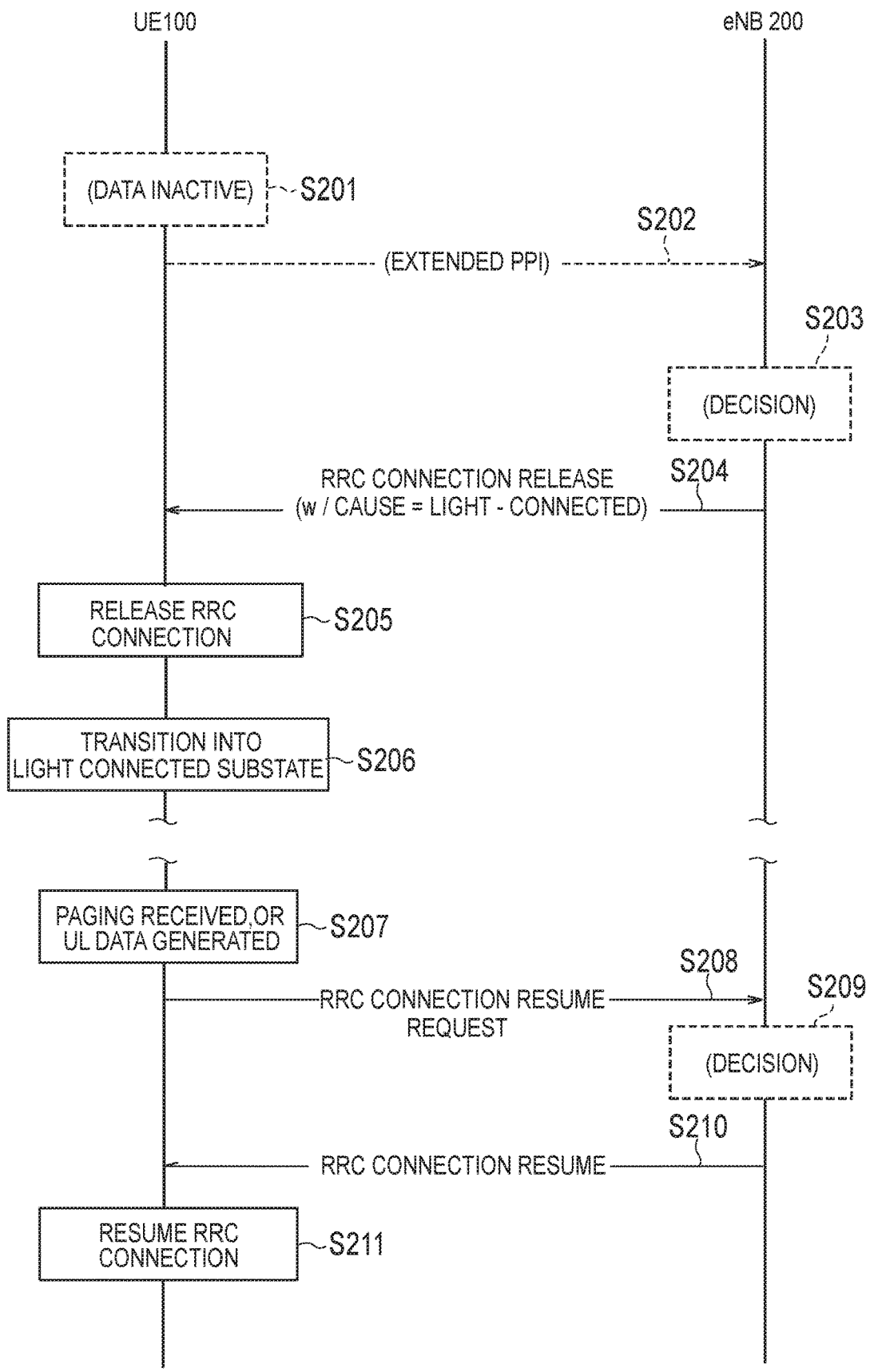
FIG. 8 is a diagram illustrating an operation pattern 2 of an embodiment.

FIG. 8 is a diagram illustrating the operation pattern 2 of the embodiment. In the following, a difference from the operation pattern 1 illustrated in FIG. 7 will be mainly described and a redundant description thereof will be omitted.

As illustrated in FIG. 8, steps S201 to S203 are similar to the operation pattern 1.

In step S204, the eNB 200 transmits, to the UE 100, an RRC connection release message including information instructing a transition to a light connected state as a release cause. The RRC connection release message may include information designating a deactivating function among the plurality of functions described above. In this case, the handling of the deactivating function is the same as the operation pattern 1. The RRC connection release message may include a resume identifier (resume ID). The eNB 200 holds the UE context in association with the resume identifier.

In step S205, the UE 100 releases the RRC connection with the eNB 200 in response to the reception of the RRC connection release message including the information instructing the transition to the light connected state as the release cause.

In step S206, the UE 100 transitions to the light connected state. In the operation pattern 2, the light connected state is one state (substate) of the RRC idle mode. The UE 100 in the light connected state performs a process for receiving a paging message transmitted within an RAN paging area.

After that, in step S207, the UE 100 in the light connected state detects a predetermined event in the UE 100.

In step S208, the UE 100 in the light connected state transmits, to the eNB 200, an RRC connection resume request requesting the resume of the RRC connection in response to the detection of the predetermined event. The RRC connection resume request may include information requesting the activation of the deactivated function. The RRC connection resume request may include a resume identifier.

In step S209, in response to the reception of the RRC connection resume request, the eNB 200 determines whether the request is acceptable. Here, the description will be given on the assumption that the eNB 200 determines that the request is acceptable.

In step S210, the eNB 200 transmits an RRC connection resume message to the UE 100. The eNB 200 may include, in the RRC connection resume message, a list of functions that permit activation and/or functions that reject activation.

In step S211, the UE 100 resumes the RRC connection based on the RRC connection resume message received from the eNB 200. The eNB 200 resumes the use of the UE context based on the resume identifier.

(Mobility Status Information)

In the operation patterns 1 and 2, the notification indicating interruption of data communication may include mobility status information related to the moving speed of the UE 100. The eNB 200 receives the mobility status information related to the moving speed of the UE 100 from the UE 100 and determines the range of the RAN paging area corresponding to the UE 100 based on the mobility status information.

Alternatively, the UE 100 may transmit the mobility status information to the eNB 200 at any of the following timings.

First, the UE 100 transmits the mobility status information with the update of the tracking area or the RAN paging area as a trigger. In this case, the UE 100 may include the mobility status information in a tracking area update message or a RAN paging area update message.

Second, the UE 100 transmits mobility status information with the cell reselection as a trigger. In this case, the UE 100 may include the mobility status information in the cell update message.

Third, the UE 100 transmits the mobility status information with an inquiry from the eNB 200 as a trigger.

Fourth, the UE 100 periodically transmits the mobility status information. The period may be configured from the eNB 200 to the UE 100.

Figure 9:
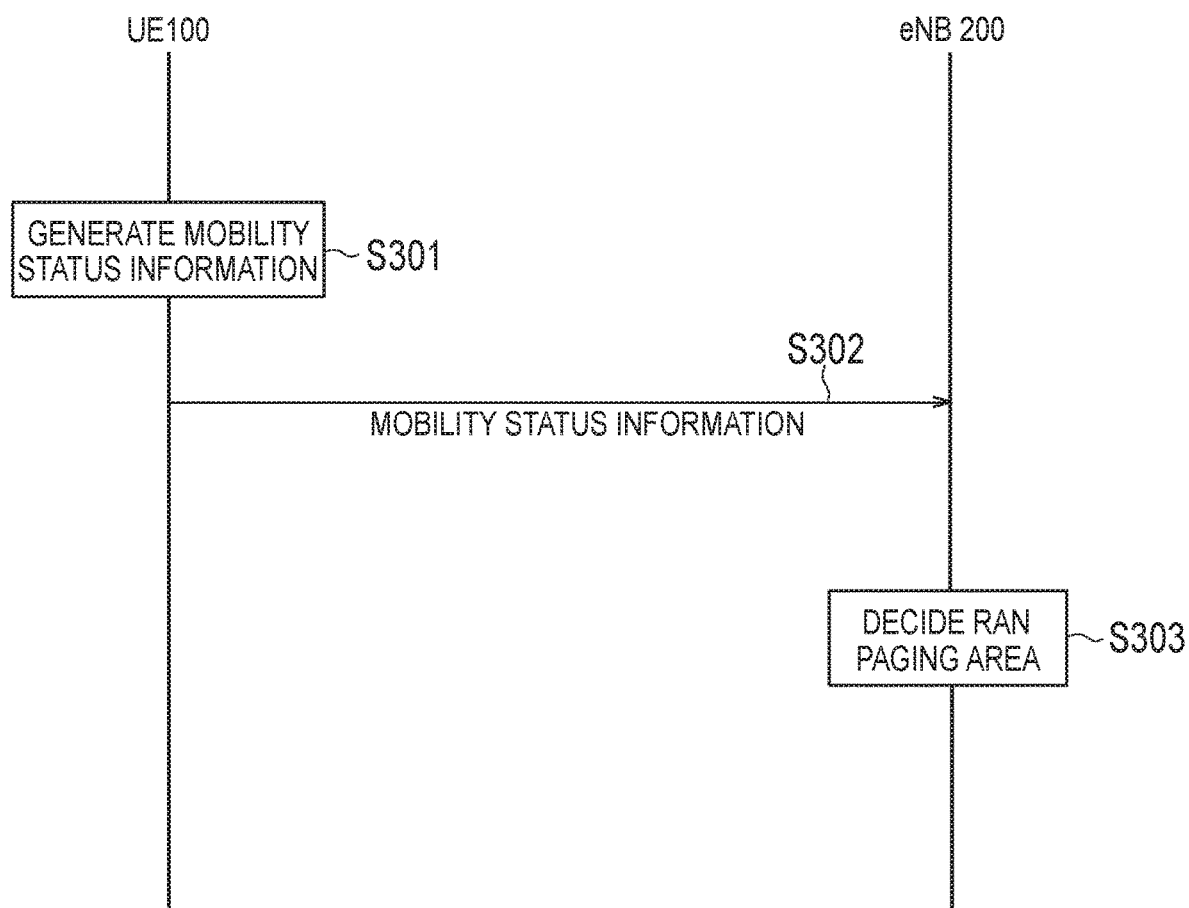
FIG. 9 is a diagram illustrating an operation for determining a RAN paging area according to an embodiment.

FIG. 9 is a diagram illustrating the operation for determining the RAN paging area.

As illustrated in FIG. 9, in step S301, the UE 100 generates mobility status information. The mobility status information includes at least one piece of the following information.

1) Number of times of handovers or number of times of cell reselections within predetermined time. The predetermined time may be configured from the eNB 200 to the UE 100.

2) Average moving speed within predetermined time. The moving speed can be obtained from position information of the UE 100. The moving speed is not limited to a value of a direct moving speed (for example, xxx km/h) and may be an index of a moving speed (for example, high/mid/low). The predetermined time may be configured from the eNB 200 to the UE 100.

3) 1-bit identifier indicating whether moving speed exceeds threshold value. Here, the above 1) or 2) can be used as the moving speed. The threshold value may be configured from the eNB 200 to the UE 100.

4) Cell history information of UE 100. The cell history information includes a plurality of combinations of the ID of the cell and the staying time in the cell.

In step S302, the UE 100 transmits, to the eNB 200, a message including the mobility status information. The UE 100 may further include its own position information in the message. The UE 100 may further include its own category (UE category) in the message.

In step S303, the eNB 200 decides the range of the RAN paging area based on the mobility status information. The eNB 200 may notify the MME 300C of the list of cells (and eNBs) belonging to the determined RAN paging area.

As an example, the eNB 200 configures a wider RAN paging area to the UE 100 having a high moving speed so as to prevent missed paging. On the other hand, a narrower RAN paging area is configured to the UE 100 with a slow moving speed so as to reduce the number of signalings by the paging message.

As another example, the eNB 200 configures a wider RAN paging area to the UE 100 of a category M1 so as to reduce power consumption. The category M1 is a UE category for machine type communication and requires a power saving operation. This makes it possible to reduce the RAN paging area update message required when leaving the RAN paging area.

First Embodiment

Hereinafter, the first embodiment will be described on the premise of the above-described LTE system. The first embodiment is an embodiment relating to the mobility in the light connected state.

Here, the basic operation of the mobility in the light connected state will be described.

- The S1 connection of the UE 100 in the light connected state is maintained at "anchor eNB" and is active. The anchor eNB may be an eNB 200 that has transitioned the UE 100 to the light connected state. If the UE 100 moves to another RAN paging area, the anchor eNB may be switched.
- Paging (RAN paging) can be performed with the RAN (E-UTRAN 10) startup with respect to the UE 100 in the light connected state. The RAN paging may be started by the anchor eNB.
- Paging process (RAN paging) is controlled by the anchor eNB.
- The RAN paging area can be configured to be UE-specific.
- The UE 100 in the light connected state performs a cell reselection mechanism similar to the RRC idle mode.
- The context information (UE AS context) of the UE 100 in the light connected state is held in both the UE and the anchor eNB.
- From the viewpoint of the network, the light connected state is an EPS connection management (ECM) connected state. The ECM indicates a connection state between the UE 100 and the core network (MME 300C).
- If the UE 100 in the light connected state detects paging or starts data transmission, the UE 100 resumes the connection with the eNB 200. Alternatively, the UE 100 may transition to the RRC connected mode.
- The UE 100 transitions to the light connected state by RRC signaling.
- The UE-specific RAN paging area is configured from the eNB 200 to the UE 100 by dedicated signaling or broadcast signaling. The RAN paging area is designated by a cell list or a paging area ID.

If the UE 100 moves outside the configured RAN paging area, the UE 100 in the light connected state notifies the network of the fact.

The RAN paging area is constituted by one or more cells. The plurality of cells may be managed by different eNBs.

The UE 100 in the light connected state performs the DRX operation by using the same parameters as the DRX operation of the RRC idle mode. The parameters for determining the paging occasion may include the ID of the UE (for example, IMSI, S-TMSI, resume ID, and the like).

The eNB 200 according to the first embodiment is the eNB 200 included in the RAN of the mobile communication system. The eNB 200 includes a receiver 220 that receives, from the UE 100 in the light connected state, a message indicating that the UE 100 left the RAN paging area, and a transmitter (backhaul communication unit 240) that transmits, to the MME 300C (mobility management entity), paging area information related to the update of the RAN paging area in response to the reception of the message. The light connected state is a state in which the anchor eNB in the RAN paging area maintains the S1 connection for the UE 100, and the RAN paging area is configured to the UE 100.

In the eNB 200 according to the first embodiment, the transmitter (the backhaul communication unit 240) may transmit, to the MME 300C, a switch request message including the paging area information. The switch request message is a message for a request to switch the S1 connection to the eNB 200.

In addition, the paging area information may include information indicating a new RAN paging area for the UE 100. The new RAN paging area includes the area (cell) of the eNB 200.

Figure 10:
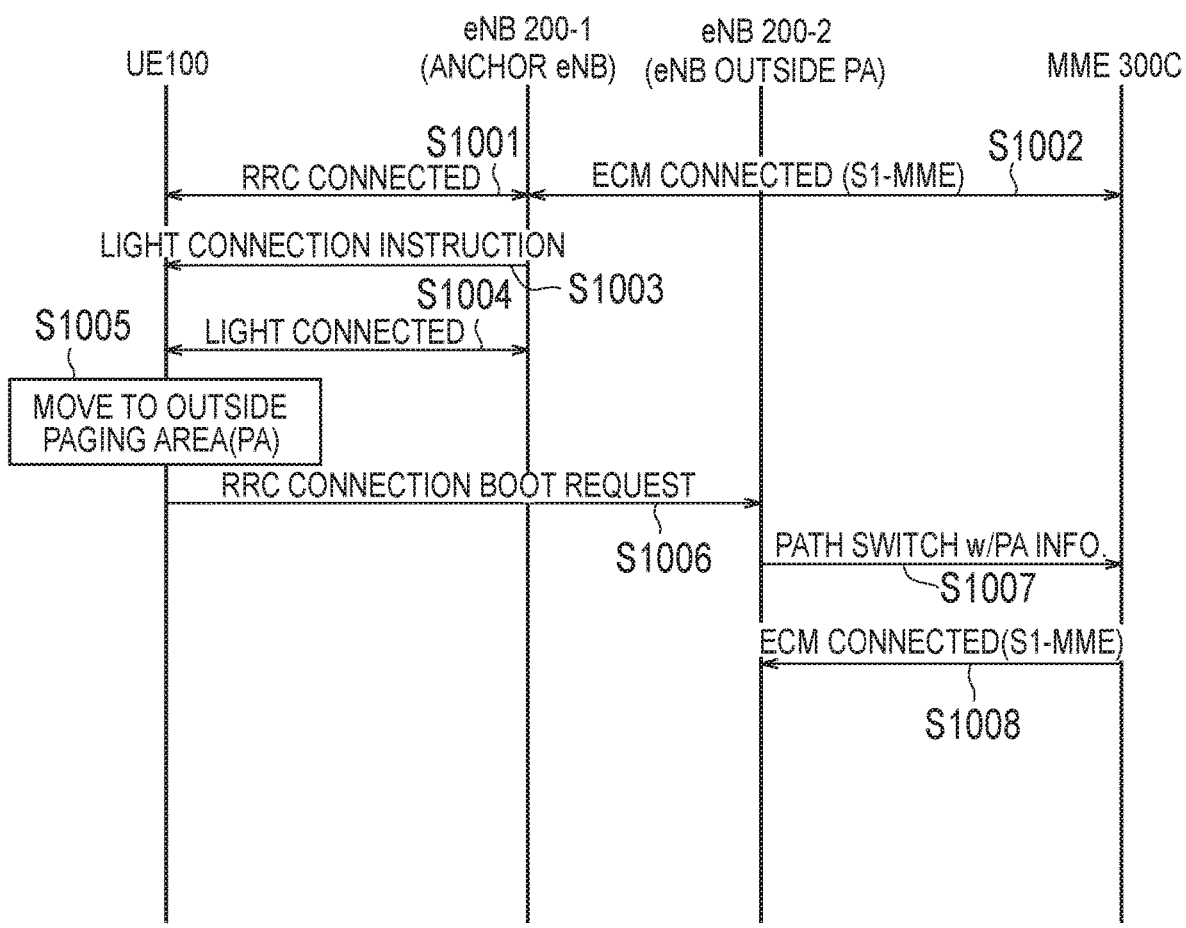
FIG. 10 is a diagram illustrating an operation example according to a first embodiment.

FIG. 10 is a diagram illustrating the operation example according to the first embodiment. In the initial state of FIG. 10, the UE 100 is in the RRC connected mode (S1001). In addition, the connection state between the UE 100 and the core network (MME 300C) is ECM connected, and the S1 connection (S1-MME connection) for the UE 100 exists between the eNB 200 and the MME 300C. Although not illustrated, the S1 connection (S1-U connection) for the UE 100 also exists between the eNB 200 and the S-GW 300U.

As illustrated in FIG. 10, in step S1003, the anchor eNB 200-1 transmits, to the UE 100, a transition instruction (light connection Instruction) instructing the transition to the light connected state. As described above, the transition instruction is transmitted in the RRC connection reconfiguration message or the RRC connection release message. The anchor eNB 200-1 may configure, to the UE 100, the RAN paging area specific to the UE 100.

In step S1004, the UE 100 transitions to the light connected state in response to the reception of the transition instruction from the cell (serving cell) of the anchor eNB 200-1.

In step S1005, the UE 100 detects that the UE 100 has moved outside the RAN paging area configured to the UE 100 based on, for example, the cell identifier, the paging area ID, or the like transmitted from the eNB 200-2 outside the RAN paging area. It should be noted that the eNB 200-2 may not have the X2 interface with the anchor eNB 200-1.

In step S1006, the UE 100 transmits, to the eNB 200-2, a message indicating that the UE 100 has left the RAN paging area configured to the UE 100. The message may be a message (paging area update) indicating the update of the RAN paging area. The message may be a message (RRC connection boot request) requesting the resume from the light connected state. The message may be an RRC connection resume request message.

The message may include resume ID, short resume MAC-I, and resume cause.

Alternatively, instead of the resume ID, an identifier including a combination of a cell identifier (cell ID) and a cell-radio. Network temporary identifier (C-RNTI) may be used. The cell ID may be an E-UTRAN cell global identifier (ECGI), an E-UTRAN cell identifier (ECI), or a physical cell identifier (PCI). The cell ID and/or the C-RNTI may not be explicitly given as the instruction for the transition to the Light Connected (for example, RRC connection release). If the UE 100 receives the transition instruction to the Light Connected, the UE 100 may store the cell ID of the cell and the currently allocated C-RNTI. When resuming, the UE 100 reads this value and notifies the value to the eNB 200.

The ECGI includes a combination of an ECI and a PLMN ID. That is, the ECI does not have a PLMN ID. Therefore, if the ECI is used as the cell identifier, the identifier composed of the combination may be valid only within the same public land mobile network (PLMN).

If the PCI is used as the cell identifier, the eNB 200 may discover the specific eNB (anchor eNB) by using the PCI received from the UE 100 and the neighbor list (neighbor relation table).

Whether the UE 100 should notify the identifier including the above combination may be designated from the eNB 200. For example, the eNB 200 informs the SIB so as to notify the identifier composed of the combination of the ECI and the C-RNTI. Alternatively, the eNB 200 may be configured individually for the UE 100.

In addition, although omitted in the drawing, even if the ECI and the PCI are used, since the eNB 200 can specify the specific eNB (anchor eNB), the eNB 200 can obtain UE context (configuration information) from the specific eNB by using the X2 or S1 interface.

Although not illustrated in the drawing, the identifier composed of the combination may be used for specifying the calling UE in paging. If the UE 100 receives the paging message, the UE 100 reads the identifier, and if the identifier matches the identifier in the paging message, the UE 100 determines that the UE 100 is called. In this case, the UE 100 may start an operation of establishing an RRC connection (for example, transmitting an RRC connection request).

In addition, instead of the resume cause, boot cause related to the resume from Light Connected may be used. Alternatively, as the resume cause, a new value such as LightConnected-Access related to the resume from Light Connected may be defined.

In step S1007, in response to the reception of the message from the UE 100, the eNB 200-2 transmits, to the MME 300C, a message (S1 path switch request) for requesting to switch the S1 connection to the eNB 200-2 on the S1 interface. The message (S1 path switch request) includes the ID and address of the E-RAB that performs the path switch, the source MME UE S1AP ID, the cell ID, and the like. The eNB 200-2 includes paging information (PA info.) indicating a new RAN paging area for the UE 100 in the message (path switch request). The paging information (PA info.) may be a list of cells (recommended cell list) included in a new RAN paging area.

In step S1008, the MME 300C grasps or determines a new RAN paging area of the UE 100 based on the message (path switch request) received from the eNB 200-2. That is, the MME 300C can manage the RAN paging area in which the UE 100 exists, based on the paging information (PA info.).

In addition, the MME 300C performs a process of switching the S1 connection for the UE 100 from the anchor eNB 200-1 to the eNB 200-2.

In the present sequence, it is assumed that no X2 interface exists between the anchor eNB 200-1 and the eNB 200-2. However, if the X2 interface exists between the anchor eNB 200-1 and the eNB 200-2, the eNB 200-2 may transmit the UE context release or the UE context retrieve to the anchor eNB 200-1 on the X2 interface in response to the reception of the message from the UE 100. The UE context release is a message for requesting the release of the context information of the UE 100. The UE context retrieve is a message for acquiring the context information of the UE 100. The eNB 200-2 may include paging information (PA info.) in these messages. The anchor eNB 200-1 may transfer, to the MME 300 C, the paging information (PA info.) received from the eNB 200-2.

Second Embodiment

In a second embodiment, a difference from the first embodiment will be mainly described below. The second embodiment is an embodiment related to an operation in which the eNB 200 performs RAN paging.

The eNB 200 according to the second embodiment includes a controller 230 that performs RAN paging on the UE 100 in the light connected state and determines whether the RAN paging is successful, and a transmitter (backhaul communication unit 240) that transmits, to the MME 300C, a failure notice indicating the failure of the RAN paging in response to the failure of the RAN paging. The RAN paging is an operation in which the RAN performs paging of the UE 100 in units of RAN paging areas. The failure notice may be a message for causing the MME 300C to perform paging based on the tracking area in which the UE 100 exists. Therefore, even if the RAN paging fails, the MME 300C can perform normal paging.

The eNB 200 according to the second embodiment may include a receiver (backhaul communication unit 240) that receives, from another eNB 200, information related to whether the another eNB 200 in the RAN paging area has succeeded in paging. The controller 230 determines that the RAN paging has failed in response to the failure of the paging at both the eNB 200 and the another eNB 200.

Figure 11:
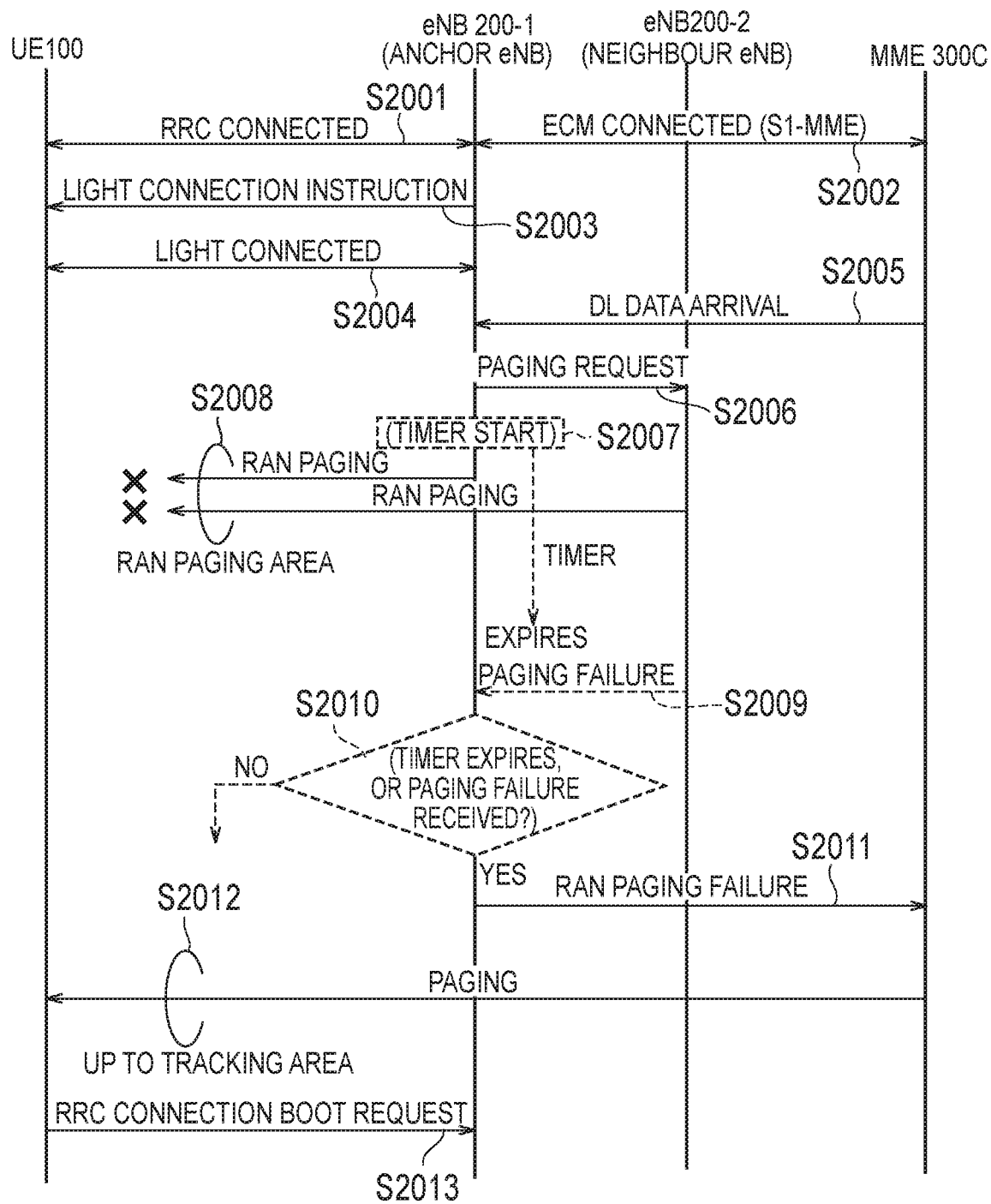
FIG. 11 is a diagram illustrating an operation example according to a second embodiment.

FIG. 11 is a diagram illustrating the operation example according to the second embodiment. In FIG. 11, the anchor eNB 200-1 and the eNB 200-2 belong to the same RAN paging area. The anchor eNB 200-1 and the eNB 200-2 may be connected via the X2 interface. In the initial state of FIG. 11, the UE 100 is in the RRC connected mode (S2001, S2002). It should be noted that the operation indicated by the broken line in FIG. 11 is not essential.

As illustrated in FIG. 11, the operations of steps S2003 and S2004 are the same as those of the first embodiment.

In step S2005, the anchor eNB 200-1 receives data (DL data) addressed to the UE 100 from the S-GW 300U via the S1 connection for the UE 100. The anchor eNB 200-1 determines to start the paging of the UE 100 in response to the reception of the data.

In step S2006, the anchor eNB 200-1 transmits, to the eNB 200-2, a paging request requesting implementation of paging (RAN paging) of the UE 100. The paging request may include information for specifying a paging timing (see a third embodiment).

In step S2007, the anchor eNB 200-1 starts a timer when the anchor eNB 200-1 determines to start paging or when the anchor eNB 200-1 transmits a paging request. The anchor eNB 200-1 may stop the timer when the anchor eNB 200-1 receives a paging response from the UE 100 or when the anchor eNB receives a paging success notification from the eNB 200-2.

In step S2008, the anchor eNB 200-1 and the eNB 200-2 transmit a paging message (RAN paging) addressed to the UE 100 within the RAN paging area configured to the UE 100. Here, the description will be given on the assumption that the UE 100 has failed to receive the paging message (Ran paging).

In step S2009, the eNB 200-2 transmits, to the anchor eNB 200-1, a failure notification (paging failure) indicating that the paging (RAN paging) of the UE 100 has failed.

In step S2010, the anchor eNB 200-1 determines whether the timer has expired and/or whether the failure notification (paging failure) has been received. Here, the description will be given on the assumption that the timer has expired and/or the failure notification (paging failure) has been received.

In step S2011, the anchor eNB 200-1 transmits, to the MME 300C, a failure notification (RAN paging failure) indicating the failure of the RAN paging on the S1 interface. The failure notification (RAN paging failure) includes an identifier (for example, eNB UE S1AP ID) for the MME 300C to identify the UE 100. The failure notification (RAN paging failure) may include an MME UE S1AP ID, a cause (for example, RAN Paging Failed), and the like. Instead of the failure notification (RAN paging failure), a paging request that requests execution of paging may be used.

In step S2012, the MME 300C transmits a paging message (PAGING) to each eNB 200 belonging to the tracking area in which the UE 100 exists, in response to the reception of the failure notification (RAN paging failure) from the anchor eNB 200-1. Each eNB 200 belonging to the tracking area in which the UE 100 exists transmits the corresponding paging message to its own cell. However, instead of transmitting the paging message to all the eNBs 200 belonging to the tracking area in which the UE 100 exists, the MME 300C may transmit the paging message only to a part of the eNBs 200 belonging to the tracking area.

In step S2013, in response to the reception of the paging message (PAGING), the UE 100 transmits, to the eNB 200 (for example, the anchor eNB 200-1), a message (RRC connection boot request) requesting the resume from the light connected state.

Third Embodiment

In a third embodiment, a difference from the first and second embodiments will be mainly described below. The third embodiment is an embodiment related to the DRX operation of the UE 100 in the light connected state.

First, a general idle mode DRX operation will be described. In order to reduce power consumption, discontinuous reception (DRX) may be configured to the UE 100. In the DRX operation, the UE 100 in the RRC idle mode monitors a paging message in paging occasion occurring at a predetermined time interval (DRX cycle). In the DRX operation, the UE 100 intermittently monitors the PDCCH so as to receive paging. The UE 100 decodes the PDCCH by using a paging identifier (P-RNTI: paging radio network temporary identifier) and acquires paging channel allocation information. The UE 100 acquires a paging message based on the allocation information. A PDCCH monitoring timing in the UE 100 is determined based on an identifier (IMSI: international mobile subscriber identity) of the UE 100. The PDCCH monitoring timing (PDCCH monitoring subframe)

in the DRX operation is referred to as paging occasion (PO). The PO corresponds to paging reception occasion.

The UE 100 and the eNB 200 calculate paging occasion (PO) and a paging frame (PF) that is a radio frame including paging occasion as follows.

A system frame number (SFN) of PF is obtained from the following Formula (1).

$$\text{SFN mod } T = (T \text{ div } N)*(\text{UE\_ID mod } N) \quad (1)$$

However, it should be noted that T is the DRX cycle of the UE 100 for monitoring paging and is expressed by the number of radio frames. In addition, T is the smaller one of a default DRX value the eNB 200 broadcasts by a system information block (SIB) and a UE-specific DRX value configured to the UE 100 by the NAS message. If the UE-specific DRX value is not configured, the UE 100 applies the default DRX value. In addition, N is the minimum value of T and nB. nB is a value selected from 4T, 2T, T, T/2, T/4, T/8, T/16, and T/32. UE_ID is a value obtained from "IMSI mod 1024".

Among PFs thus obtained, the index i_s is obtained by the following Formula (2) and the subframe number of the PO corresponding to the index i_s is obtained.

$$i\_s = \text{floor}(\text{UE\_ID}/N) \text{mod } Ns \quad (2)$$

However, Ns is the maximum value from among 1 and nB/T.

Figure 12:
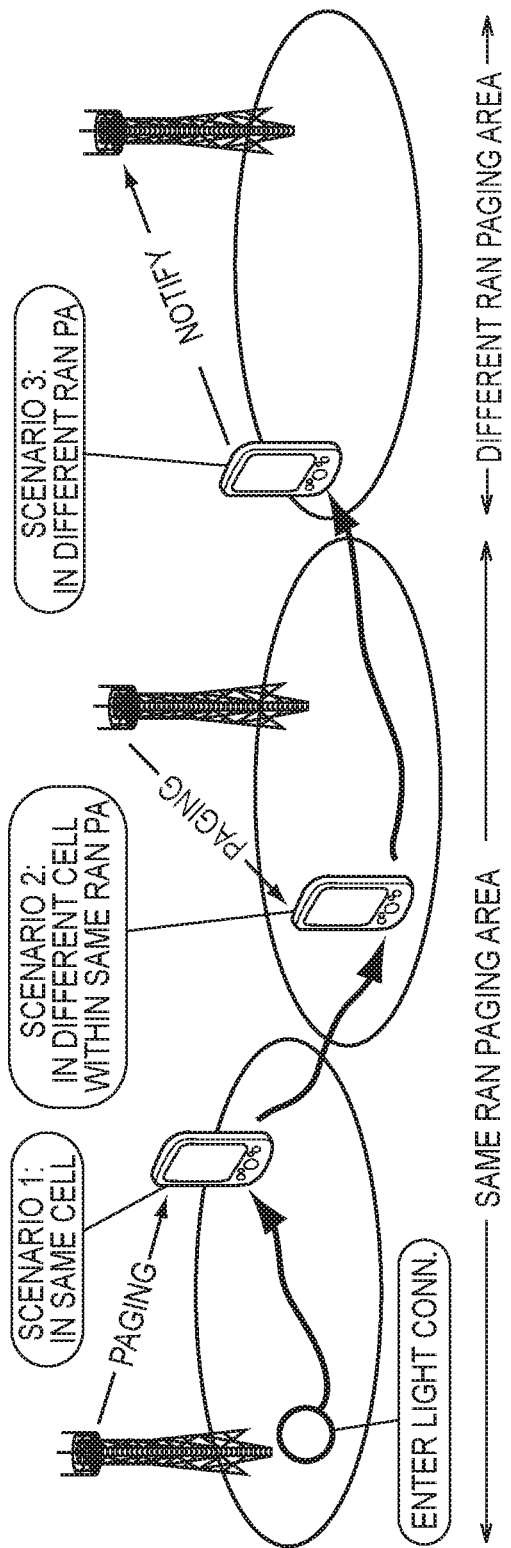
FIG. 12 is a diagram illustrating an operation according to a third embodiment.

Next, an operation according to a third embodiment will be described. FIG. 12 is a diagram illustrating an operation according to the third embodiment.

The UE 100 according to the operation pattern 1 of the third embodiment includes a receiver 110 that receives, from a serving cell, a transition instruction instructing a transition to a light connected state, and a controller 130 that transitions to the light connected state in the serving cell and performs a DRX operation of an RRC connected mode. That is, as illustrated in FIG. 12(a), the UE 100 continues the DRX operation of the RRC connected mode while the UE 100 exists in the serving cell at the time point of the transition to the light connected state. As illustrated in FIG. 12(b), the controller 130 of the UE 100 stops the DRX operation of the RRC connected mode in response to the UE 100's moving from the serving cell to another cell in the RAN paging area. The controller 130 of the UE 100 stops the DRX operation of the RRC connected mode and starts the operation based on the DRX operation of the RRC idle mode. The operation based on the DRX operation of the RRC idle mode is an operation of determining PF and PO by a calculation formula of a paging frame (PF) and a paging occasion (PO) in a DRX operation of the RRC idle mode or a calculation formula that diverts the same. As illustrated in FIG. 12(c), the controller 130 of the UE 100 performs notification when the UE 100 moves to a different RAN paging area.

Alternatively, even when the UE 100 moves from the serving cell at the time of the transition to the light connected state to another cell, if the another cell belongs to the same RAN paging area, the UE 100 according to the operation pattern 2 of the third embodiment continues the DRX operation of the RRC connected mode. In this case, as illustrated in FIGS. 12(a) and 12(b), the UE 100 can continue the DRX operation of the RRC connected mode within the same RAN paging area. That is, even if the UE 100 moves to another cell, the UE 100 performs a receiving operation according to the connected mode DRX. As described later, in the paging request, the configuration value (DRX Config) of the connected mode DRX may be transferred to the eNB 200-2.

Here, such an operation may be performed in units of eNBs 200. That is, in the operation patterns 1 and 2 of the third embodiment, the "serving cell" may be read as "serving eNB" or "anchor eNB", and the "other cell" may be read as "another eNB".

In the operation patterns 1 and 2 of the third embodiment, the UE 100 other than the anchor eNB does not necessarily hold the context information of the UE 100. Therefore, it is desirable for the another eNBs within the same RAN paging area to acquire, from the anchor eNB, information for determining the timing of the paging.

The eNB 200-2 (see FIG. 11) according to the third embodiment includes a controller 230 that performs RAN paging on the UE 100 in the light connected state. The controller 230 acquires, from the anchor eNB 200-1 (see FIG. 11), information for determining the timing of transmitting the paging message for RAN paging to the UE 100. The information for determining the timing includes at least one of the identification information (for example, IMSI, S-TMSI, resume ID, and the like) of the UE 100 and the DRX configuration of the RRC connected mode. The anchor eNB 200-1 may include such information in the paging request and transmit the information to the eNB 200-2 (see step S2006 in FIG. 11).

In the third embodiment, the identification information for determining the timing of the paging may be an E-UTRAN cell global identifier (ECGI) and a cell-radio. network temporary identifier (C-RNTI). If the UE 100 transitions to the light connected state, the anchor eNB 200-1 may allocate the identification information to the UE 100.

Fourth Embodiment

In a fourth embodiment, a difference from the first to third embodiments will be described below. The fourth embodiment is an embodiment related to a message for transitioning the UE 100 to the light connected state.

Figure 13:
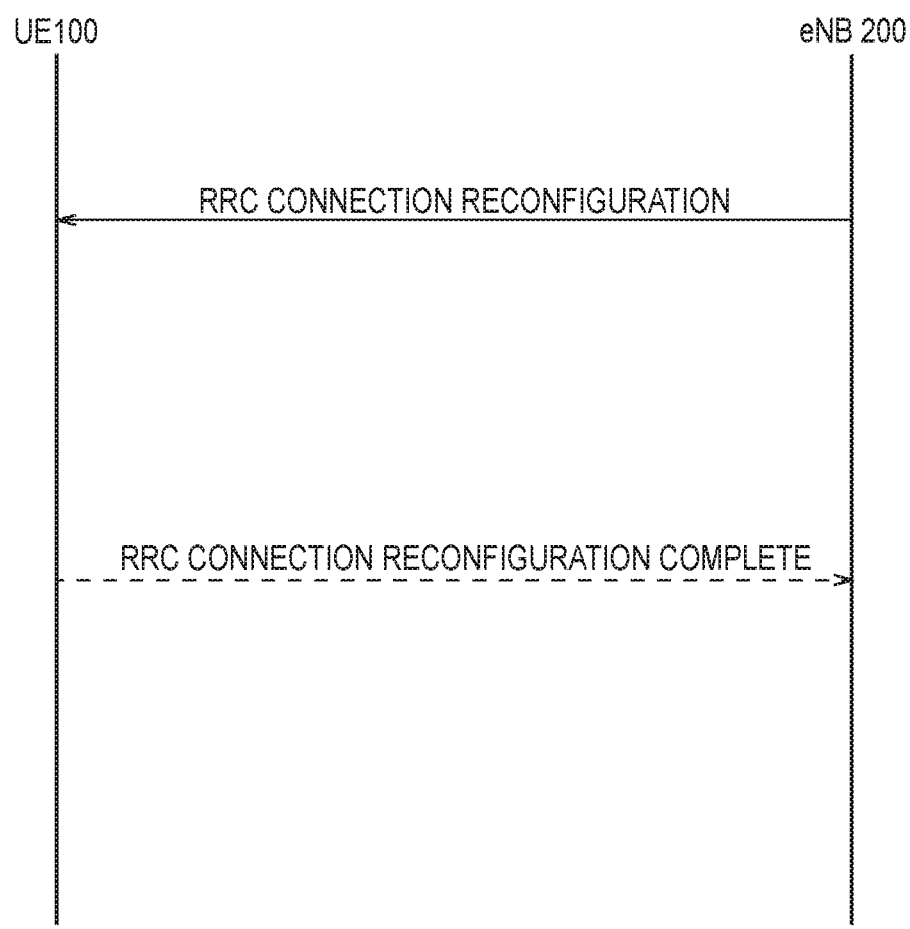
FIG. 13 is a diagram illustrating an operation pattern 1 of a fourth embodiment.

FIG. 13 is a diagram illustrating the operation pattern 1 of the fourth embodiment. In the operation pattern 1 of the fourth embodiment, the UE 100 includes a receiver 110 that receives an RRC connection reconfiguration message from the serving cell, a transmitter 120 that transmits, to the serving cell, an RRC connection reconfiguration complete message, which is a response message to the RRC connection reconfiguration message, in response to the fact that the transition instruction instructing the transition to the light connected state is not included in the RRC connection reconfiguration message, and a controller 130 that stops the transmission of the RRC connection reconfiguration complete message in response to the fact that the transition instruction is included in the RRC connection reconfiguration message. Here, the transition instruction may be configuration information related to light connection. According to the operation pattern 1, the UE 100 does not transmit the RRC connection reconfiguration complete message if the light connection is set up in the RRC connection reconfiguration. Therefore, signaling can be reduced.

Figure 14:
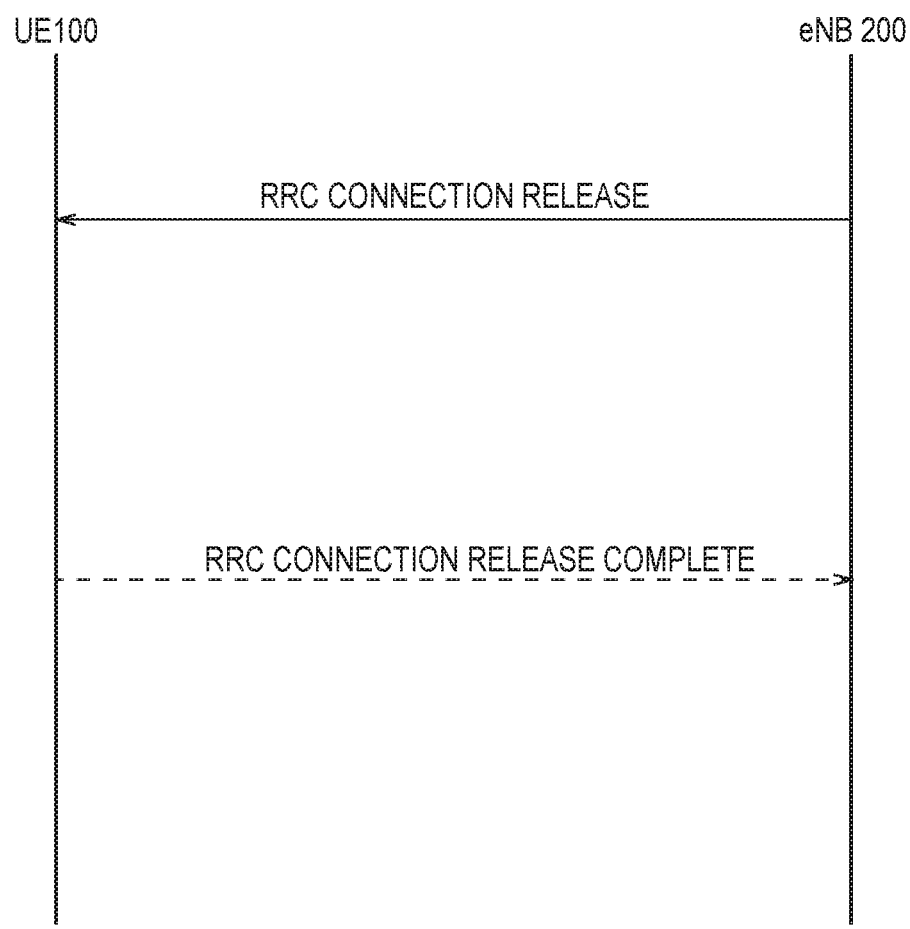
FIG. 14 is a diagram illustrating an operation pattern 2 of a fourth embodiment.

FIG. 14 is a diagram illustrating the operation pattern 2 of the fourth embodiment. In the operation pattern 2 of the fourth embodiment, the UE 100 includes a receiver 110 that receives an RRC connection release message from the serving cell, a controller 130 that stops the transmission of the response message to the RRC connection release message in response to the fact that the transition instruction instructing the transition to the light connected state is not included in the RRC connection release message, and a transmitter 120 that transmits an RRC connection release complete message to the serving cell as a response message in response to the fact that the transition instruction is included in the RRC connection release message. Here, the transition instruction may be configuration information related to light connection. The controller 130 of the UE 100 transitions to the light connected state when confirming that the RRC connection release complete message has been delivered based on, for example, HARQ ACK. According to the operation pattern 2, the UE 100 transmits an RRC connection release complete message if the transition to the light connected state is instructed in the RRC connection release. Therefore, the eNB 200 can more reliably confirm that the UE 100 has transitioned to the light connected state.

Fifth Embodiment

In a fifth embodiment, a difference from the first to fourth embodiments will be described below. The fifth embodiment is an embodiment related to a message for the UE 100 to resume from the light connected state.

The UE 100 according to the fifth embodiment includes a transmitter 120 that transmits, to the serving cell, information indicating the resume from the light connected state, and a controller 130 that resumes from the light connected state without receiving the RRC connection reconfiguration message from the serving cell. The information indicating the resume from the light connected state is, for example, the above-described RRC activation request, RRC connection resume request, RRC connection boot request, or the like.

FIG. 15 is a diagram illustrating the operation example according to the fifth embodiment.

As illustrated in FIG. 15, according to a conventional approach (legacy approach), the UE 100 in the light connected state transmits, to the eNB 200, a request for resuming from the light connected state. Next, the UE 100 receives an RRC connection reconfiguration message from the eNB 200 and transmits an RRC connection reconfiguration complete message to the eNB 200, thereby resuming from the light connected state (transitioning to the RRC connected mode).

As illustrated in FIG. 15(*b*), according to the first approach (one-step approach) of the fifth embodiment, the UE 100 in the light connected state merely transmits, to the eNB 200, a notification (Indication) indicating the resume from the light connected state, thereby resuming from the light connected state (transitioning to the RRC connected mode). The notification (indication) may include information requesting allocation of radio resources (scheduling request) and/or information reporting an uplink buffer status (buffer status report). If it cannot be confirmed based on HARQ ACK or the like that the notification (Indication) has been delivered, the UE 100 may maintain the light connected state or may transition to the RRC idle mode.

As illustrated in FIG. 15(*c*), according to the second approach (two-step approach) of the fifth embodiment, the UE 100 in the light connected state transmits, to the eNB 200, a request for resuming from the light connected state and merely receives an acknowledgment for the request from the eNB 200, thereby resuming from the light connected state (transitioning to the RRC connected mode). The request may include information requesting allocation of radio resources (scheduling request) and/or information reporting an uplink buffer status (buffer status report). The eNB 200 may transmit a non-acknowledgment to the UE 100 in response to the request. If the UE 100 receives the non-acknowledgment, the UE 100 may maintain the light connected state or may transition to the RRC idle mode. Whether to maintain the light connected state or transition to the RRC idle mode may be designated by the non-acknowledgment.

Therefore, according to the fifth embodiment, signaling can be reduced as compared with the conventional approach. The reasons why the RRC connection reconfiguration is unnecessary include the following causes. Specifically, assuming that the light connected state is similar to the RRC connected mode, the eNB 200 does not need to prepare a new resource (that is, there is no reason for rejection). In addition, there is no need for the UE to newly apply the configuration (that is, there is no configuration failure). Furthermore, there is no RRC state transition, and it is not necessary for the eNB 200 and the UE 100 to recognize each other. For example, if the UE 100 is operating according to the DRX of the RRC connected mode, since the reception timing of the UE 100 is the same in both the light connected state and the RRC connected mode, data communication is not established.

However, the UE 100 may perform the operation according to the fifth embodiment only when the UE 100 exists in a cell at the time point of the transition to the light connected state. If the UE 100 moves from the cell at the time of the transition to the light connected state to another cell in the same RAN paging area, the UE 100 may perform the operation according to the conventional approach.

The notification (indication) and the request according to the fifth embodiment may be transmitted to the eNB 200 during a random access procedure. As an example, the notification (indication) and the request may be transmitted from the UE 100 to the eNB 200 during Msg1 (random access preamble/PRACH transmission) or Msg3 (scheduled transmission) of the random access procedure. In addition, the acknowledge or the non-acknowledgment may be transmitted from the eNB 200 to the UE 100 during Msg2 (random access response) or Msg4 (contention resolution) of the random access procedure.

Sixth Embodiment

In a sixth embodiment, a difference from the first to fifth embodiments will be described below. The sixth embodiment is an embodiment related to a notification (extended PPI) indicating interruption of data communication.

As described above, the UE 100 transmits a notification (extended PPI) to the eNB 200 if data communication does not occur (or there is no possibility of occurrence). On the other hand, in the sixth embodiment, the notification (extended PPI) is improved as follows.

The UE 100 according to the sixth embodiment includes a controller 130 that detects interruption of data communication with the serving cell (eNB 200), and a transmitter 120 that transmits, to the serving cell, a notification (extended PPI) indicating the interruption of the data communication in response to the detection of the interruption (data inactive) of the data communication. The controller 130 estimates the expected time of the interruption of the data communication. The transmitter 120 transmits the notification (extended PPI) including the expected time.

The UE 100 (controller 130) may estimate the interruption time of the data communication according to information from the application layer as described above. Specifically, the time notified from the application layer may be the expected time as it is. Alternatively, It may be expected on the UE 100 (AS side) by using information such as which application is activated from the application layer and which application is shut down, or information such as whether the user is currently performing an operation (or whether foreground communication is assumed or only background communication is assumed). The access stratum (AS) includes each protocol below the RRC layer. For example, the traffic generation pattern is preliminarily collected on the AS side, the traffic prediction is performed, and the predicted time is estimated while using information from the application layer and the like as needed.

In the sixth embodiment, the notification (extended PPI) may be a direct notification that it wants to enter the light connected state or a direct notification that it is possible to enter the light connected state.

In the sixth embodiment, the eNB 200 may explicitly or implicitly configure, to the UE 100, whether to transmit the notification (extended PPI). For example, if an identifier indicating the permission of the transmission of the notification (extended PPI) is informed to SIB, or if the eNB 200 configures (setup) the transmission of the notification (extended PPI), the UE 100 determines that the transmission of the notification (extended PPI) is permitted. In addition, 1) whether the notification (extended PPI) is determined by the past state (that is, data is not generated), 2) whether the notification (extended PPI) is determined by the future expectation (that is, there is no possibility of occurrence), and 3) whether the notification (extended PPI) is determined by including both the past and the future may be configured from the eNB 200 to the UE 100. Furthermore, a prohibit timer value and/or a report period of the notification (extended PPI) may be configured from the eNB 200 to the UE 100. The prohibit timer is a timer that specifies the time until the UE 100 can transmit the next notification (extended PPI) after transmitting the notification (extended PPI).

In the sixth embodiment, the notification (extended PPI) may include a recommended cycle or a desired DRX cycle of DRX for light connection. The UE 100 (the controller 130) may determine a desired value of the DRX cycle based on the above-described expected time of the interruption of the data communication. Specifically, the UE 100 determines an appropriate DRX cycle based on its own situation and transmits the DRX cycle during the notification (extended PPI). The UE 100 may apply the notified DRX cycle when the notification is performed. Alternatively, the UE 100 may configure the DRX cycle according to the response (such as RRC connection reconfiguration) by the eNB 200. In the case of applying the DRX cycle by performing the notification, it may be regarded as transitioning to Light Connected with this application.

It should be noted that the eNB 200 may configure (for example, broadcast or unicast) the timer value to the UE 100 until transitioning to Light Connected. The UE 100 resets (restarts) the timer when data communication is performed, and transitions to Light Connected when the timer expires. The UE 100 may notify the eNB 200 of the data interruption when the data communication is interrupted (for example, when the expected time is after the timer expires) while the timer is operating.

Seventh Embodiment

In a seventh embodiment, a difference from the first to sixth embodiments will be described below. The seventh embodiment is an embodiment related to the cell reselection operation of the UE 100 in the light connected state.

The UE 100 according to the seventh embodiment includes a controller 130 that performs the cell reselection operation in the light connected state. In the cell reselection operation, the controller 130 preferentially selects a cell that supports a resume from the light connected state as a serving cell of the UE 100.

A general cell reselection operation is an operation of selecting an appropriate cell according to a ranking based on the priority of the frequency to which the cell belongs and the radio quality of the cell.

In the cell reselection operation according to the seventh embodiment, the UE 100 (controller 130) may set the cell that supports Light Connected as the highest priority. The UE 100 (controller 130) may set the cell that does not support Light Connected as the lowest priority. Here, highest/lowest means the priority (for example, "8", "−1") higher/lower than the priority (CellReselectionPriority: 0 to 7) broadcasted from the eNB 200 or a value obtained by adding the priority and subpriority (CellReselectionSubPriority: 0.2, 0.4, 0.6, 0.8).

Alternatively, in the cell reselection operation according to the seventh embodiment, the UE 100 (controller 130) may prioritize the cell that supports Light Connected by introducing an offset into the ranking. For example, a positive offset is added to the cell that supports Light Connected and/or a negative offset is added to the cell that does not support Light Connected. The offset value may be a predefined value or a value set from the eNB 200. If the offset value is set from the eNB 200, the eNB 200 may broadcast the offset value, or may set the offset value by UE-specific dedicated signaling.

In the seventh embodiment, the eNB 200 may configure, to the UE 100, whether to perform priority control of cells supporting the resume from the light connected state. The configuration may be configured when transitioning to the light connected state. The configuration may be included in the RRC connection reconfiguration or the RRC connection release.

Each eNB 200 (each cell) may broadcast information indicating whether the light connected state (specifically, the resume from the light connected state) is supported. As an example, the eNB 200 transmits the information by SIB. Such information may be implicit information. For example, the UE 100 may regard the cell transmitting the identifier of the RAN paging area as the cell supporting the light connected state.

In the seventh embodiment, the UE 100 may transition to the RRC idle mode in response to no detection of the cell that supports the resume from the light connected state and satisfies a predetermined radio quality criterion (for example, S criterion). As an example, the UE 100 may transition to the RRC idle mode if the cell that satisfies S criterion is only the legacy cell (that is, the cell that does not support the light connected state).

Other Embodiments

The present invention is not limited to the case in which the above-described embodiments are separately and independently performed, but two or more embodiments may be performed in combination. For example, a part of operations according to one embodiment may be added to other embodiments. Alternatively, a part of operations according to one embodiment may be replaced with a part of operations of other embodiments.

In the above embodiment, the case in which the UE 100 receives multimedia broadcast multicast service (MBMS) or is interested in receiving multimedia broadcast multicast service (MBMS) has not been particularly mentioned. However, the eNB 200 may determine whether to transition the UE 100 to Light Connected based on the reception status or the like of the multimedia broadcast multicast service (MBMS) in the UE 100. As an example, if single-cell point-to-multipoint (SC-PTM) reception is not performed in the light connected state (for example, if SC-PTM reception is not permitted, if UE capability is insufficient, or the like), the eNB 200 does not transition the UE 100 to Light Connected. As another example, when interest in MBMS service reception (for example, SC-PTM reception) is indicated in the MBMS interest indication, the eNB 200 does not transition the UE 100 to Light Connected. In addition, some UEs 100 cannot receive the MBMS in the RRC connected state. If the UE 100 is capable of MBMS reception with Light Connected, the eNB 200 may transition the UE 100 to Light Connected in response to the fact that the UE 100 indicates interest in MBMS service reception (for example, SC-PTM reception).

In addition, in the first embodiment described above, the example in which the identifier including the combination of the cell ID and the C-RNTI is included in the paging message has been described.

Meanwhile, even if MT data with high priority (incoming call in the UE 100) occurs, there is no means for indicating the situation in the current paging. Therefore, if paging occurs for the UE 100 that prioritizes MBMS reception (for example, SC-PTM reception), there is a possibility that it cannot appropriately determine whether MBMS reception is continued or whether MBMS reception is interrupted and RRC connection is prioritized.

Therefore, priority information is assigned to the paging message so that appropriate determined can be made. The priority information may be a value of establishment cause (for example, high priority access), may be an identifier indicating that the incoming call has high priority, may be a numerical value (for example, 0 to 7) indicating the priority, or may be a bearer identifier associated with the incoming call. In addition, the priority information may be provided by a list, and each entry of the list may correspond to each entry of a list of UE identifiers (paging record list) in the paging message. Alternatively, the priority information may be incorporated in the entry (that is, paging record) of the paging record list. The priority information may be determined by the eNB 200 or may be determined by the MME 300C.

The UE 100 having received the paging message including the priority information determines necessity of an RRC connection start process (for example, transmission of RRC connection request) by using the priority information. If the RRC connection process is started, the message of the RRC connection process may notify to the eNB 200 that it is a process based on the priority information (for example, "prioritized MT call"), and the notification may be included in establishment cause.

On the other hand, if the MBMS reception is prioritized rather than the paging including the priority information, the UE 100 may not respond to the paging.

In each of the above-described embodiments, the example in which the light connected state is terminated with the occurrence of the predetermined event as a trigger has been described. The light connected state may be valid only during a period in which the timer configured from the eNB 200 to the UE 100 is in operation. In this case, the predetermined event may be the expiration of the timer. Alternatively, the light connected state may be valid only during a period in which the UE 100 exists within a predetermined frequency. For example, the UE 100 having received the instruction of the light connected state in a certain cell may terminate the light connected state in response to the movement to a cell having a frequency different from the frequency to which the cell belongs.

In each embodiment described above, the LTE system has been exemplified as the mobile communication system. However, the present disclosure is not limited to the LTE system. The present disclosure may be applied to systems other than the LTE system.

(Additional Note 1)

(1. Introduction)

RAN2#95 agreed the basic functions/characteristics of Light Connection as follows.

Agreements:

the functions of a lightly connected UE include:

S1 connection is kept and active in the "anchor eNB"

Support of RAN initiated paging

The paging process is controlled by "anchor eNB"

eNB controlled RAN based paging area

RAN based paging area update mechanism. RAN based paging area can be configurable as UE specific Performing cell reselection based mobility, the same cell reselection mechanism in RRC IDLE.

The UE AS context is kept in both UE and "anchor eNB" side.

The ECM state is ECM-CONNECTED, from perspective of network. From UE perspective the state is FFS.

When a "lightly connected" UE is paged (via RAN-initiated paging) or when any MO data/signaling is triggered, the UE will get back to be connected to eNB. The related procedure is FFS.

A UE enters into "lightly connected" by RRC signaling. The details are FFS.

In this contribution, the details of Light Connection are discussed.

(2. Discussion)

(2.1. Modeling Principles)

(2.1.1. RRC States and "Substate")

LTE has a couple of RRC states, i.e., RRC Connected and RRC IDLE. Even when RRC Connection Suspend/Resume procedure was introduced in Rel-13, it kept the two states modelling. The UE with suspending RRC connection is just in RRC IDLE from the state point of view, i.e., a "substate" of IDLE UEs with storing the AS context and the resume ID. The two states modelling works well to simplify the state transitions and these conditions, which were a bit complex in the legacy system. So, RAN2 should stick to the RRC modelling even if Light Connected is introduced, i.e., to be defined as Light Connected "substate" which is a part of RRC Connected or IDLE whereby certain features are added or restricted depending on the desired operations to be decided by RAN2.

Proposal 1: RAN2 should stick to the existing two states modelling, i.e., RRC Connected and IDLE, when Light Connected is defined in RRC.

(2.1.2. Baseline States)

If Proposal 1 is agreeable, Light Connected "substate" is built on top of either RRC Connected or RRC IDLE.

It was suggested in RAN2#95 that RRC Suspended/Resume is the baseline of Light Connected. It's indeed a nice way from RAN2 standardization efforts point of view, that Light Connected is a combination of suspending RRC connection from UE's perspective and the new feature to keep S1 connections in active from CN's perspective. Even though it's still beneficial for S1, i.e., eliminating the UE Context Suspend/Resume Request/Response, it should be noted that compared to Rel-13 there will be no gain in Rel-14 in terms of reductions of signalling and latency in Uu, since it relies on Rel-13 procedure. Additionally, the ECM state mismatch will happen between the NW and the UE in Light Connected, i.e., "The ECM state is ECM-CONNECTED, from perspective of network" but ECM-IDLE from the UE's perspective since the UE is in RRC IDLE during RRC Connection is suspended. It's unclear whether the mismatch is acceptable to the other WGs.

Observation 1: RRC Suspend-based Light Connection may be possible without any gain in terms of signalling/latency reduction in Uu.

Observation 2: It's unclear whether the ECM state mismatch between the NW and the UE in Light Connected is acceptable.

On the other hand, RRC Connected-based approach was also proposed. Needless to say, the most significant benefit of RRC Connected is low access latency in MO and MT calls. Potentially, no paging is necessary for MT call, although it's already agreed to introduce "Support of RAN initiated paging" for Light Connection. In addition, the ECM-state is naturally aligned between the NW and the UE. So, RRC Connected-based Light Connection has the potential to improve the signalling and latency in Uu, without unnecessary impacts to the higher layer, i.e., NAS. However, it's obviously worse for the UE power consumption just to keep the UEs in legacy RRC Connected, i.e., it cannot achieve the objective that "The solution shall enable the UE power consumption to be comparable to that one in RRC_IDLE". Therefore, some optimizations would be necessary, if RRC Connected-based Light Connection is the way.

Observation 3: RRC Connected-based Light Connection may have the potential to improve the signalling overhead and the access latency in Uu without unnecessary impacts to the higher layer, although the standardization efforts will be necessary in RAN2 to minimize the UE power consumption.

As the first statement of WI objectives stated "The objective of this work item is to reduce the radio and network interfaces signalling overhead, and improve the UE access latency as well as UE power consumption for all device types". The work should consider all device types, i.e., not just MTC UEs, but also normal LTE UEs like smartphones. Regarding MTC type traffic, it was already optimized by RRC Connection Suspend/Resume in Rel-13 and it's of course applicable to normal LTE UEs. So, Rel-14 work should rather focus on normal LTE UEs, e.g., smartphone traffics.

Observation 4: Light Connection should be efficient for not only the MTC type traffic, which was already optimized in Rel-13, but also the normal LTE traffic like smartphone, which seems to be the primary challenge in Rel-14.

Considering the observations above, i.e., ECM state mismatch, further optimization of signalling/latency and adapation for smartphone traffic, RAN2 should take RRC Connected state as the baseline for Light Connected "substate".

Proposal 2: RAN2 should take RRC Connected state as the baseline for Light Connected.

(2.2. RRC Signaling)

2.2.1. Entering to Light Connected

RAN2#95 agreed that "A UE enters into "lightly connected" by RRC signaling. The details are FFS". If Proposal 2 is agreeable, it's straight forward to use RRC Connection Reconfiguration message for setup of Light Connected, since RRC Connection Release for RRC Connection suspension makes the UE transition to RRC IDLE.

Proposal 3: RAN2 should use RRC Connection Reconfiguration message for setup of Light Connected.

However, one drawback with RRC Connection Reconfiguration message is to perform the handshake with RRC Connection Reconfiguration Complete, while this isn't needed for RRC Connection Release. From the signalling reduction point of view, it is preferable for the UE not to send the RRC Connection Reconfiguration Complete. However, without an acknowledgement such as the case with RRC Connection Release message would increase the probability of state mismatch between the serving cell and the UE. In contrast, if RRC Connected-based Light Connection is already a substate of RRC Connected state then the issue with mismatch of state transition would not be a significant concern. So, RAN2 should discuss whether the RRC Connection Reconfiguration Complete is necessary when the UE goes to Light Connected.

Proposal 4: RAN2 should discuss whether or not an acknowledgement from the UE, e.g., RRC Connection Reconfiguration Complete, is necessary when the UE goes to Light Connected.

It's also worth considering whether to allow autonomous transition to Light Connected. The serving cell may set the UE with an "inactivity" timer via broadcast/dedicated signalling, and the UE autonomously goes to Light Connected when the timer expires. It could further reduce the overhead for Light Connected control in Uu.

Proposal 5: RAN2 should discuss whether to allow the autonomous entering to Light Connected, with e.g., an "inactivity timer", for further signalling reduction.

(2.2.2. Leaving from Light Connected)

It was also agreed that "When a "lightly connected" UE is paged (via RAN-initiated paging) or when any MO data/signaling is triggered, the UE will get back to be connected to eNB. The related procedure is FFS". So, it's worth considering how to return from Light Connected to RRC Connected.

With the legacy approach, the handshake to get RRC Connected needs (at least) three steps, e.g., (1) RRC Connection Resume Request, (2) RRC Connection Resume and (3) RRC Connection Resume Complete, as illustrated in (a) of FIG. 15. On the other hand, the signalling and latency could be reduced if the handshake is minimized, i.e., (b) and (c) in FIG. 1.

The one-step approach, e.g., with an indication from the UE as (b) in FIG. 15, is beneficial to minimize the signalling and latency. Regarding the state mismatch issue discussed in Proposal 4, from the perspective of reachability of messages, only the DL will be an issue mainly due to the UE's radio problem (i.e., the reception errors during T310 runs, which is seen only in the UE, never in the serving cell). So, the one-step approach is technically feasible.

It could be also considered whether the serving cell needs to reject the UE getting back to RRC Connected, as (c) in FIG. 15. If Proposal 2 is agreeable, i.e., RRC Connected-based "substate", there seems no need to have the reject message since the UE in Light Connected is already part of RRC Connected. When the number of RRC Connection needs to be reduced for some reason, the serving cell may initiate RRC Connection Release anytime, as it is today.

So, while the one-step approach is our preference, RAN2 should discuss whether to optimize the signalling during the return from Light Connected to RRC Connected.

Proposal 6: RAN2 should consider to minimize the handshake for return from Light Connected to RRC Connected.

(2.2.3. Awareness of Inactivity During RRC Connected)

Since "A UE enters into "lightly connected" by RRC signaling", the serving cell needs to determine when to trigger entering Light Connected. One of the possible implementation is that the serving cell monitors the traffic behaviour and has the UE to enter Light Connected when the UE's packet is not transmitted/received for a period. It relies on the expected traffic behaviour, so if the expectation is not accurate then the signalling overhead may actually increase, e.g., frequent transitions between Light Connected and RRC Connected, or the chance to entering Light Connected is missed. While MTC-type traffic is somewhat easily expected, LTE-type traffic, esp. smartphone's traffic behaviour, may not be as easy for the NW to predict. Therefore, it may be necessary for the UE to provide some assistance information since the UE has a better knowledge/control of its traffic behaviour. So, it's worth considering whether the serving cell may configure the UE to provide the assistance information for its decision to trigger Light Connected.

Proposal 7: RAN2 should discuss whether the serving cell may configure the UE to provide the assistance information, for the decision of RRC signalling to make the UE to enter Light Connected.

If Proposal 7 is agreeable, the assistance information may have some similarity with the existing Power Preference Indicator (PPI) and/or MBMS Interest Indication (MII). With PPI, the UE may inform of lowPowerConsumption when its power consumption is preferred to be optimized by e.g., longer DRX cycle. The MII was used to inform of the MBMS frequencies of interest and the priority between Unicast and MBMS e.g., when the handover to the frequency is preferred. In this case, the UE may inform the serving cell of the possibility to enter Light Connection; in other words, the UE may send the assistance information when the data transmission/reception has been/will be inactive in certain duration. The details and necessity of any additional assistance are FFS, e.g., UE's expected inactive time.

Proposal 8 RAN2 should consider if the UE should send the assistance information upon data inactivity.

(2.3. Activities During Light Connected)

(2.3.1. Paging Monitoring)

RAN2#95 agreed to support RAN-initiated paging, so the UE needs to monitor it during Light Connected in the subframes determined "as a baseline that Rel-13 legacy PO/PF calculations are used for the RAN-initiated paging".

On the other hand, the three scenarios could be considered when the UE returns to RRC Connected associated with UE mobility, as illustrated in FIG. 12.

Scenario 1: The UE remains in the same cell as where it entered Light Connected.

This scenario may happen often, especially in case of smartphone is assumed. If Light Connection is a part of RRC Connected, i.e., Proposal 2, C-RNTI is still active and valid, which could be still reused to page the UE. So, the UE may monitor Paging in the occasions determined by the existing Connected mode DRX (C-DRX).

Scenario 2: The UE is in a different cell within the same RAN paging area (PA) where it entered Light Connected.

In the different cell, the C-RNTI is no longer valid since it's a cell-specific ID. So, the other ID may be necessary to page the UE, such as "(a) NAS UE ID (i.e. S-TMSI), (b) Rel-13 UE Resume ID, (c) a new RAN UE ID or (d) IMSI mode". However, the "paging occasion" is still determined by C-DRX if the DRX-Config is transferred to the target cell e.g., within "X2 paging".

Scenario 3: The UE is outside of the RAN paging area where it entered Light Connected.

In this case, "UE lightly connected is required to notify the network". The UE may be instructed to be in Light Connected in the cell where the notification is sent. So this scenario is the same condition with Scenario 1 and no further consideration is necessary.

Regarding the paging occasions for the UE in Light Connected, the C-DRX mechanism can be reused even if the UE mobility is taken into account. From RAN2's perspective, no specification impact is foreseen with this approach, while the agreement "To take as a baseline that Rel-13 legacy PO/PF calculations are used for the RAN-initiated paging. The input parameters for PO/PF calculation can be changed if necessary" implies some impacts and complexity. Therefore, RAN2 should revisit the baseline for PF/PO calculation.

Proposal 9: RAN2 should decide to reuse the existing Connected mode DRX mechanism, for the paging occasions.

If Proposal 9 is agreeable, the agreement "To define a UE ID for paging calculation. Select the UE ID from (a) NAS UE ID (i.e. S-TMSI), (b) Rel-13 UE Resume ID, (c) a new RAN UE ID or (d) IMSI mode" is no longer necessary, since the C-DRX doesn't need to input any IDs to calculate On Duration.

Proposal 10: If Proposal 9 is agreeable, RAN2 should not use any IDs for calculation of paging occasions.

Regarding the ID to page the UE, C-RNTI is used in Scenario 1 but not in Scenario 2. So, especially for Scenario 2, it's necessary "To define a UE ID conveyed in paging message. Select the UE ID from (a) NAS UE ID (i.e. S-TMSI), (b) Rel-13 UE Resume ID, (c) a new RAN UE ID or (d) IMSI mode". If Light Connected should be transparent to the CN as much as possible, the ID should be selected form the IDs which can be managed in RAN. So, the candidates are "(b) Rel-13 UE Resume ID" or "(c) a new RAN UE ID". The Resume ID is used for the eNB to retrieve the UE context from "Anchor eNB", however the exact contents of Resume ID is not visible to the UE, i.e., only the bit size is defined.

The UE could be identified by an ID which consists of ECGI (i.e., CellGlobalIdEUTRA in the "anchor eNB") and C-RNTI (allocated by the cell with ECGI). To minimize the message size, it could be also considered, instead of ECGI, to use either ECI (i.e., CellIdentity or "eNB ID+PCI") or PCI (i.e., PhysCellId). With these optimizations, it needs to be assumed that the ID is valid within a PLMN.

If the contents of ID are explicitly specified, the UE would use it to determine whether it has been paged even if the ID is not explicitly allocated via RRC signalling, e.g., RRC Connection Reconfiguration or Release when the UE transitions to Light Connected.

Proposal 11: RAN2 should define "ECGI+C-RNTI", "ECI+C-RNTI" and/or "PCI+C-RNTI" as the new RAN ID in "paging massage".

Proposal 12: If Proposal 11 is agreeable, the ID is not necessary to be explicitly allocated from the cell in "anchor eNB" to the UE when the UE enters Light Connected.

(2.3.2. UE-Based Mobility)

RAN2 agreed that "Performing cell reselection based mobility, the same cell reselection mechanism in RRC IDLE". So, the UE behaviour follows the idle mode procedure, in terms of cell reselection, which seems no problem for the UE in Light Connected as long as all the eNB in a network support the return from Light Connected to RRC Connected. Although It may be up to NW implementation, Rel-13 didn't assume all eNB in a network supports the new features, e.g., eDRX-Allowed for eDRX, voiceServiceCauseIndication for VoLTE Establishment Cause, up-CIoT-EPS-Optimisation and cp-CIoT-EPS-Optimisation for RRC Connection Resume and data over NAS respectively. So, it's worth discussion whether it can be assumed that all eNB in a network support Light Connection.

Proposal 13: RAN2 should discuss whether it can be assumed that all eNBs in a network support Light Connection.

If some eNBs don't support Light Connection, the question is how the UE should behave, since the UE may become unreachable from RAN paging. One of possibilities is that the UE prioritize the cell supporting Light Connected as much as possible. Another possibility is that the UE transition to RRC IDLE, when it reselects the cell not supporting Light Connected. RAN2 should consider the details of UE-based mobility during Light Connected.

Proposal 14: If there one or more eNBs do not support Light Connection, RAN2 should discuss the details of UE-based mobility during Light Connected, e.g., whether the cell should be de-prioritized during the cell reselection, and whether the UE should transition to RRC IDLE if such a cell is reselected.

(Additional Note 2)

1. Paging may optionally contains some priority information per UE;

A) The priority information may be;

The values from Establishment Cause, or;

The 1-bit flag to identify that this paging is for prioritized call (e.g., MT voice), or;

The number indicate its MT call priority (e.g., 0~7 like Absolute Priority for cell reselection), or;

The bearer ID associated with this paging.

The priority information may be formed as a list, and each entry in the list indicates corresponding entries in PagingRecordList within Paging, or;

The priority information may be integrated within the existing PagingRecord.

C) The priority information may be determined by the eNB (e.g., eVoLTE MT video call case) or by the MME (e.g., via the existing Paging Priority IE in S1 paging).

2. Upon reception of the paging priority in Paging, the UE;

A) May use it to decide whether to initiate RRC Connection Request (or one for Light Connection), i.e., UE implementation, or;

B) Shall initiate RRC Connection Request (or one for Light Connection) if the priority information indicates a high priority call.

The establishment cause in the request may be aligned with the priority information, e.g., "prioritized-MT-call".

The invention claimed is:

1. A communication control method in a mobile communication system, comprising:

configuring, by a base station included in a radio access network (RAN), a RAN paging area to a user equipment;

transmitting, from the base station to a neighboring base station included in the RAN paging area, a paging request that requests the neighboring base station to perform a RAN paging for the user equipment, the paging request including identification information of the user equipment and a discontinuous reception (DRX) configuration of the user equipment;

receiving, by the base station from the neighboring base station, a message indicating that the RAN paging has failed in the neighboring base station for the user equipment; and transmitting, from the base station to a core network node, a message indicating that RAN paging for the user equipment has failed, wherein the RAN paging is an operation in which the RAN performs a paging for the user equipment by a unit of the RAN paging area.

2. The communication control method according to claim 1, further comprising:

performing a cell reselection operation by the user equipment in a specific state in which the RAN paging area is configured; and performing, by the user equipment in the specific state, an operation of transitioning from the specific state to a radio resource control (RRC) idle mode when the user equipment reselects a cell not supporting the specific state in the cell reselection operation.

3. A base station included in a radio access network (RAN), comprising:

a controller configured to configure a RAN paging area to a user equipment;

a transmitter configured to transmit, to a neighboring base station included in the RAN paging area, a paging request that requests the neighboring base station to perform a RAN paging for the user equipment, the paging request including identification information of the user equipment and a discontinuous reception (DRX) configuration of the user equipment; and a receiver configured to receive, from the neighboring base station, a message indicating that the RAN paging has failed in the neighboring base station for the user equipment, wherein the transmitter is configured to transmit, to a core network node, a message indicating that RAN paging for the user equipment has failed, and the RAN paging is an operation in which the RAN performs a paging for the user equipment by a unit of the RAN paging area.

4. A base station included in a radio access network (RAN), comprising:

a receiver configured to receive, from a neighboring base station, a paging request that requests the base station to perform a RAN paging for the user equipment, the paging request including identification information of the user equipment and a discontinuous reception (DRX) configuration of the user equipment, wherein the RAN paging is an operation in which the RAN performs a paging for the user equipment by a unit of the RAN paging area;

a controller configured to perform the RAN paging based on the paging request received from the neighboring base station; and a transmitter configured to transmit a message indicating that the RAN paging has failed in the neighboring base station for the user equipment to the neighboring base station.

* * * * *